(12) United States Patent
Glen et al.

(10) Patent No.: US 8,411,073 B2
(45) Date of Patent: Apr. 2, 2013

(54) SYSTEM AND METHOD FOR DETECTING DISPLAY DISCONNECTION

(75) Inventors: David Glen, Toronto (CA); Jatin Naik, Brampton (CA); Raymond Chau, Toronto (CA); Paul Edelshteyn, Toronto (CA); Richard Fung, Thornhill (CA)

(73) Assignee: ATI Technologies ULC, Markham ON (CA)

( * ) Notice: Subject to any disclaimer, the term of this patent is extended or adjusted under 35 U.S.C. 154(b) by 1161 days.

(21) Appl. No.: 12/270,402

(22) Filed: Nov. 13, 2008

(65) Prior Publication Data

US 2009/0224866 A1   Sep. 10, 2009

Related U.S. Application Data

(60) Provisional application No. 61/033,680, filed on Mar. 4, 2008.

(51) Int. Cl.
*G06F 3/038* (2006.01)
*H04N 1/00* (2006.01)
*G08B 21/00* (2006.01)

(52) U.S. Cl. ........ 345/204; 348/180; 348/553; 340/635; 340/652; 340/653

(58) Field of Classification Search .................. 345/204; 377/54–56; 340/635, 652–653
See application file for complete search history.

(56) References Cited

U.S. PATENT DOCUMENTS

| | | | |
|---|---|---|---|
| 4,237,489 A | 12/1980 | Kresock | |
| 5,825,321 A | 10/1998 | Park | |
| 6,411,330 B1 * | 6/2002 | Purcell et al. | 348/180 |
| 6,470,063 B2 | 10/2002 | Liew | |
| 6,545,707 B1 | 4/2003 | Newcomb et al. | |
| 6,597,395 B1 | 7/2003 | Kim et al. | |
| 6,940,440 B1 | 9/2005 | Iacob | |
| 7,236,203 B1 | 6/2007 | Hojabri | |
| 7,372,455 B2 | 5/2008 | Perski et al. | |
| 7,555,094 B2 | 6/2009 | Shin et al. | |
| 8,125,572 B2 | 2/2012 | Koo | |
| 2008/0095142 A1 | 4/2008 | Sibigtroth et al. | |
| 2009/0158066 A1 | 6/2009 | Steinbusch et al. | |
| 2009/0225062 A1 | 9/2009 | Naik et al. | |

OTHER PUBLICATIONS

Non-Final Office Action mailed May 8, 2012 for U.S. Appl. No. 12/270,384, 10 pages.

* cited by examiner

*Primary Examiner* — William Boddie
*Assistant Examiner* — Alecia D English

(57) ABSTRACT

A video processing device comprises a display interface coupleable to a display device and a display controller configured to transmit a video signal via an output node of the display interface. The video signal comprises an active segment comprising video information and an inactive segment comprising synchronization information. The video processing device further comprises a display detector configured to determine whether the display device is coupled to the display interface based on a comparison of a first voltage at the output node during transmission of the inactive segment to a second voltage.

17 Claims, 11 Drawing Sheets

SYSTEM AND METHOD FOR DETECTING
DISPLAY DISCONNECTION

CROSS-REFERENCE TO RELATED
APPLICATIONS

The present application claims priority to U.S. provisional application Ser. No. 61/033,680 filed on Mar. 4, 2008 and entitled "System and Method for Detecting Display Disconnection", the entirety of which is incorporated by reference herein.

The present application is related to co-pending U.S. non-provisional application Ser. No. 12/270 384 filed on even date herewith and entitled "System and Method for Detecting Accessory Connection and Accessory Class", the entirety of which is incorporated by reference herein.

FIELD OF THE DISCLOSURE

The present disclosure relates generally to interfacing to a display device or other accessory device and more specifically to detecting whether a display device or other accessory device is connected.

BACKGROUND

Many components of a video processing system, such as a television encoder or a video digital-to-analog converter, consume a relatively high amount of power while activated. It therefore can be advantageous to detect when a display device has been disconnected so that the video processing system can enter a low power state. Moreover, a user may desire to exchange one display device for another (e.g., swapping between a monitor and a projector device) and therefore it typically is desirable to detect the swapping of display devices so that the display system can reinitialize its display configuration for the new display device. Certain display interface architectures, such as those based on the Digital Video Interface (DVI) specifications, utilize an interface pin dedicated to detecting a connection between a video processing device and a display device. However, other display architectures, such as those based on the video graphics array (VGA) specifications, composite video specifications, component video specifications, and the like, do not have a dedicated pin or line for detecting a connection with a display device. A conventional technique for detecting a connection with a display device without a dedicated detection interface pin includes indiscriminately driving a fixed current at an output line of the display interface of the video processing device under software control or in response to user input, and then measuring the voltage at the output line to determine whether a display device is connected. While this fixed current often is chosen to be output at the last display line of a frame, this resulting fixed pattern remains viewable and therefore corrupts the displayed imagery, which can cause visual artifacts bothersome and distracting to the viewer. Moreover, the software intervention and control needed to implement the detection process typically results in a decrease in overall performance and an increase in power consumed. Accordingly, an improved technique for detecting whether a display device is connected would be advantageous.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE FIGURES

FIGS. 1-13 illustrate example techniques for determining whether a display device or other accessory device is connected to a video processing device and configuring the video processing device accordingly. For ease of illustration, various embodiments of the example techniques of the present disclosure are described in the context of a system utilizing a red-green-blue (RGB) color space, while other embodiments are described in the context of a system utilizing a composite video signal or s-video signal, such as a National Television Standards Committee (NTSC)-compliant video signal. However, those techniques illustrated in the context of the RGB color space also can be implemented in other color spaces, such as luma-chroma color spaces (e.g., YUV), or in a composite context using the guidelines provided herein without departing from the scope of the present disclosure. Likewise, those techniques illustrated in the context of a composite video signal and s-video signal can be implemented based on a component video signal can be implemented in the context of a composite video signal using the guidelines provided herein without departing from the scope of the present disclosure.

Figure 1:
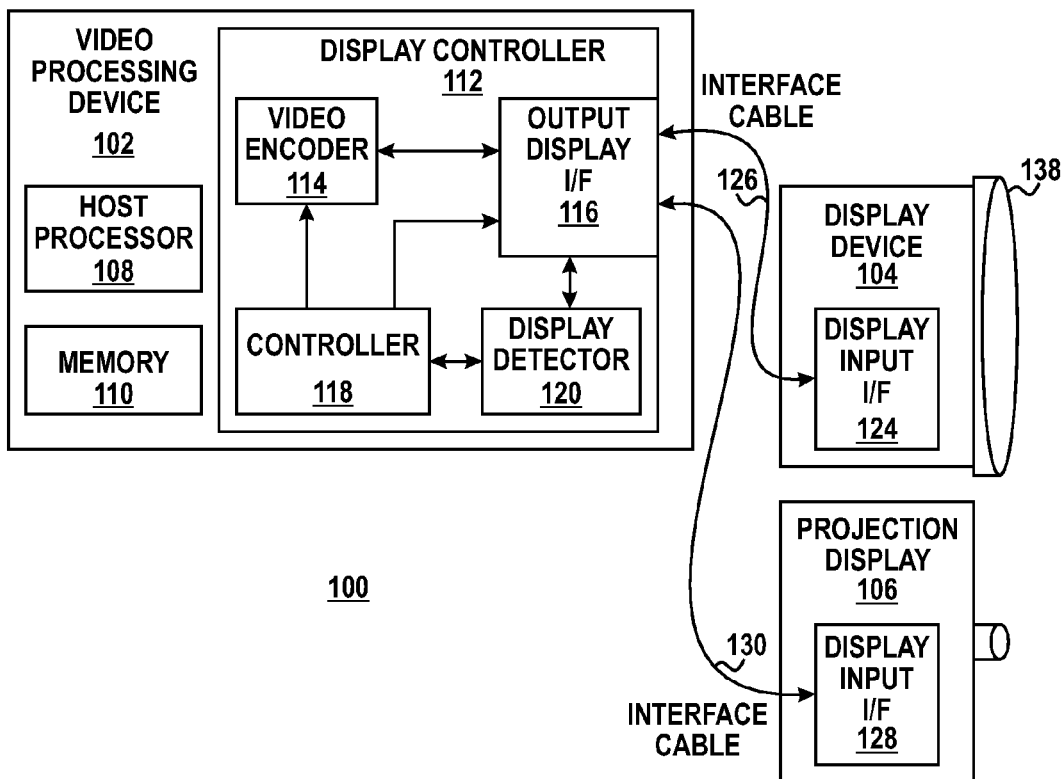
FIG. 1 is a block diagram illustrating an information handling system including components to detect a connection or disconnection of a display device in accordance with at least one embodiment of the present disclosure.

FIG. 1 illustrates an information handling system 100 in accordance with at least one embodiment of the present disclosure. The information handling system 100 includes a video processing device 102 for processing video data for display at any of a variety of display devices coupleable to the video processing device 102, for processing audio data for output at any of a variety of audio accessory devices, or a combination thereof. Examples of the display devices can include a television or a computer monitor (represented as display device 104), a projection display (represented as display device 106), and the like. Audio accessory devices (not shown) can include, for example, an audio receiver, one or more speakers, headphones, headsets, microphones, and the like. Examples of the video processing device 102 include a digital versatile disk (DVD) player, a set-top box or other television receiver, a notebook computer, a desktop computer, a video-enabled cellphone, a personal digital assistant, a portable audio/video player, and the like. The functions of the components of the information handling system can be implemented as hardware, firmware, software (that is executed by one or more processors), or a combination thereof. To illustrate, certain components can be implemented as discrete logic, an application specific integrated circuit (ASIC), a field programmable gate array (FPGA), and the like, while other functions of certain components can be implemented based on software instructions executed by one or more processors of a processing system. Further, some or all of the components can implemented in a processing device designed based on a set of register-transfer-level (RTL), Verilog instructions, or other hardware descriptor instructions that define the functionality of the processing device and which are synthesized to generate the electrical and electronic design of the processing device.

In the depicted example, the video processing device 102 includes a host processor 108, memory 110, and a display controller 112. The host processor 108 is used to process commands within video processing device 102. For example, commands associated with an application stored in memory 110 can be processed for a user by the host processor 108. Further, the host processor 108 (or a separate component) is used to process multimedia data received from a multimedia source, such as a DVD, a satellite transmission, the Internet, and the like. To illustrate, the multimedia data can be received in an encoded form, such as data encoded in accordance with a Motion Pictures Experts Group (MPEG) specification, and the host processor 108 or another component can include an MPEG decoder to decode the multimedia data into its corresponding video data and audio data. Alternately, the multimedia information can be received in an analog form, such as an analog composite signal in accordance with the National Television Standards Committee (NTSC) specification or the Phase Alternating Line (PAL) specification. In this implementation, the host processor 108, along with a tuner and other components, can receive the analog signal, and filter and process the analog signal to generate digital data for further processing at the video processing device 102.

The display controller 112 receives video data to be output for display and generates the corresponding video signals for controlling a display device that can be connected to the video processing device 102, such as the display device 104 or the display device 106. In the illustrated embodiment, the display controller 112 includes a video encoder 114, an output display interface 116, a display detector 120 and a controller 118. The video encoder 114 can include, for example, a television encoder that receives the video data and converts or otherwise formats the video data consistent with the display format of the display device, such as an NTSC encoder, a PAL encoder, a composite video encoder, a component video encoder, etc. The output display interface 116 comprises components to convert the video data into the corresponding electronic control signals for output to a display device. The output display interface 116 further includes the receptacle mechanism used to physically and electrically connect the video processing device 102 to a display device or accessory device, either directly or via a cable or other display connector. In one embodiment, a plurality of output display interfaces 116 are implemented by the video processing device 102 so as to be compatible with different connector architectures. To illustrate, the output display interface 116 can include an RCA jack connector or coaxial cable connector for composite video signaling, a VGA connector, a 4-pin DIN s-video connector, or RCA connectors for component video signaling, and the like.

In at least one embodiment, the video processing device 102 outputs a video signal composed of inactive segments and active segments. The inactive segments carry non-visual information such as synchronization information (e.g., vertical blanking and horizontal blanking), closed-captioning content (which is subsequently converted to visual information by a display device), and the like. The active segments carry visual information representative of pixels to be displayed on a display device (if connected), such as color information, luminance information, chrominance information, and the like. During an inactive component (e.g., a vertical sync component) of some or all of the inactive segments of the video signal result in a relatively fixed predetermined voltage or current. As discussed in greater detail below, because the output node has a higher overall resistance when a display device is not connected and a lower overall resistance when a display device is connected, and as the video signal is relatively fixed during the inactive component, a voltage determined at the output node during the output of the inactive component of the video signal can be compared with a predetermined reference voltage to determine whether a display device is connected. The use of inactive components of inactive segments of a video signal to detect a connection of a display device avoids distorting the segments of the video signal associated with pixel characteristics (e.g., color, luminance, etc.), and, thus, reduces the amount of corruption or distortion of the displayed imagery detectable by a viewer.

Figure 10:
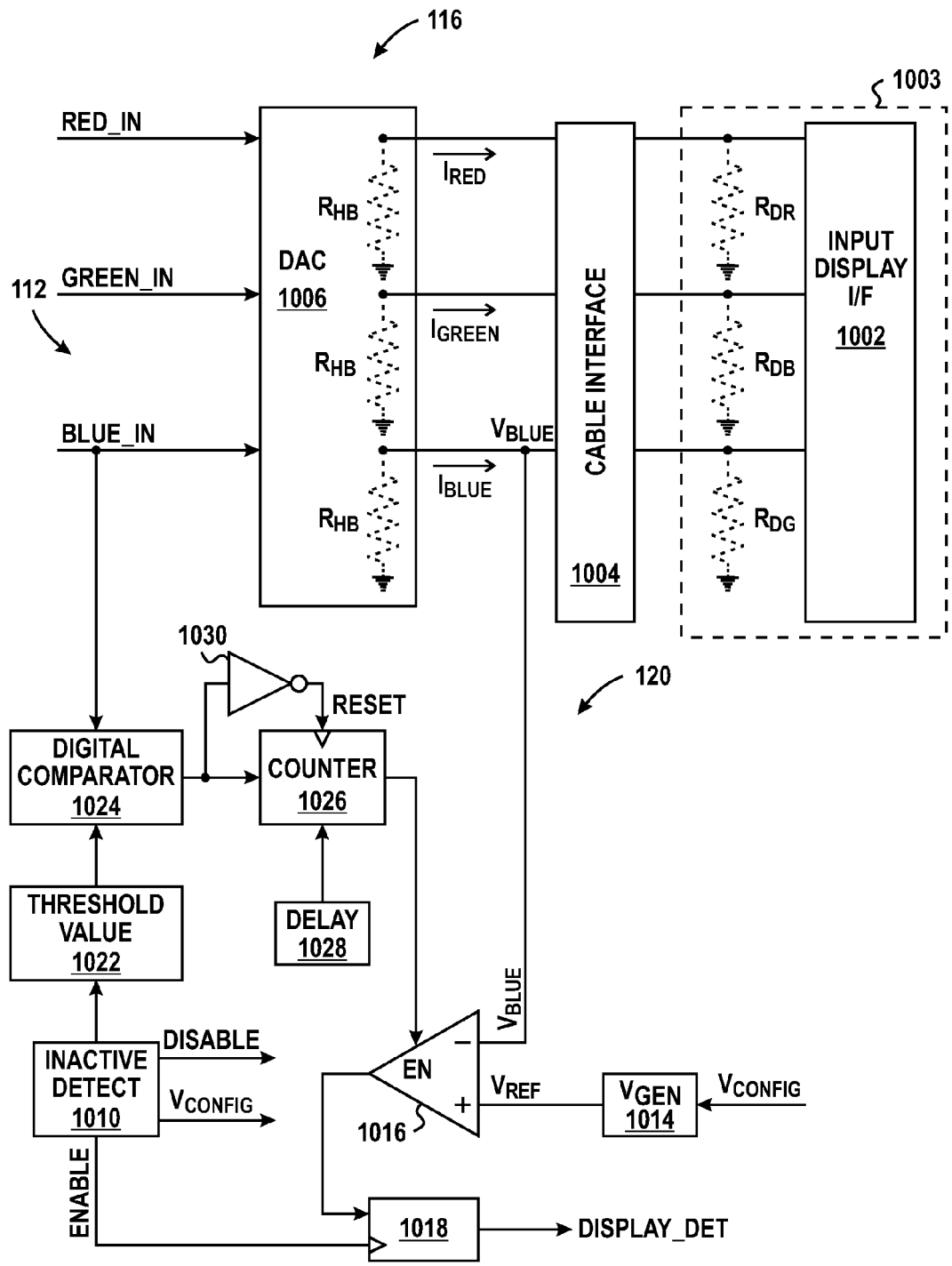
FIG. 10 is a diagram illustrating yet another example implementation of a display controller of the information handling system of FIG. 1 in accordance with at least one embodiment of the present disclosure.
Figure 11:
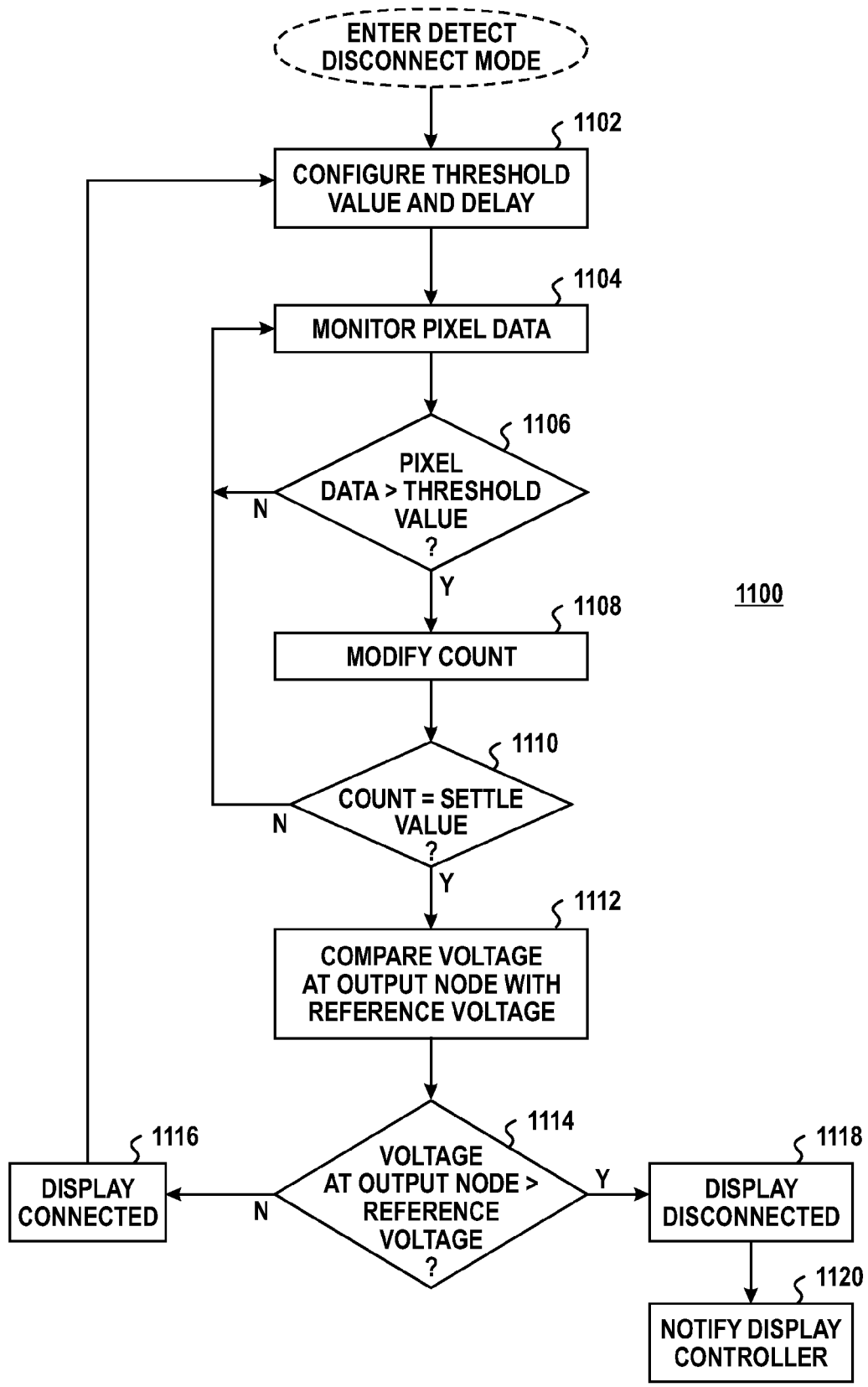
FIG. 11 is a flow diagram illustrating an example method for detecting a disconnection of a display device from a video processing device in the context of the display controller implementation of FIG. 10 in accordance with at least one embodiment of the present disclosure.
Figure 12:
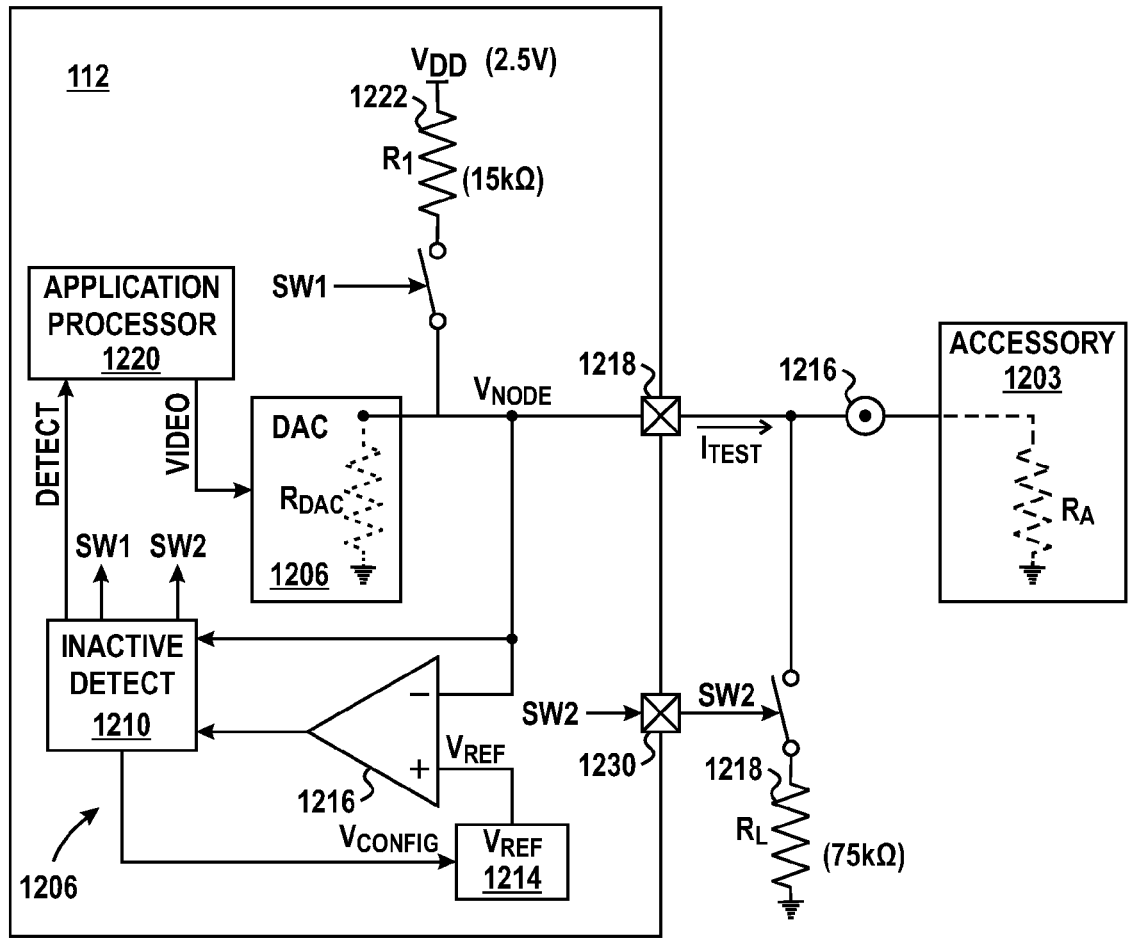
FIG. 12 is a diagram illustrating an additional example implementation of the display controller of the information handling system of FIG. 1 in accordance with at least one embodiment of the present disclosure.
Figure 13:
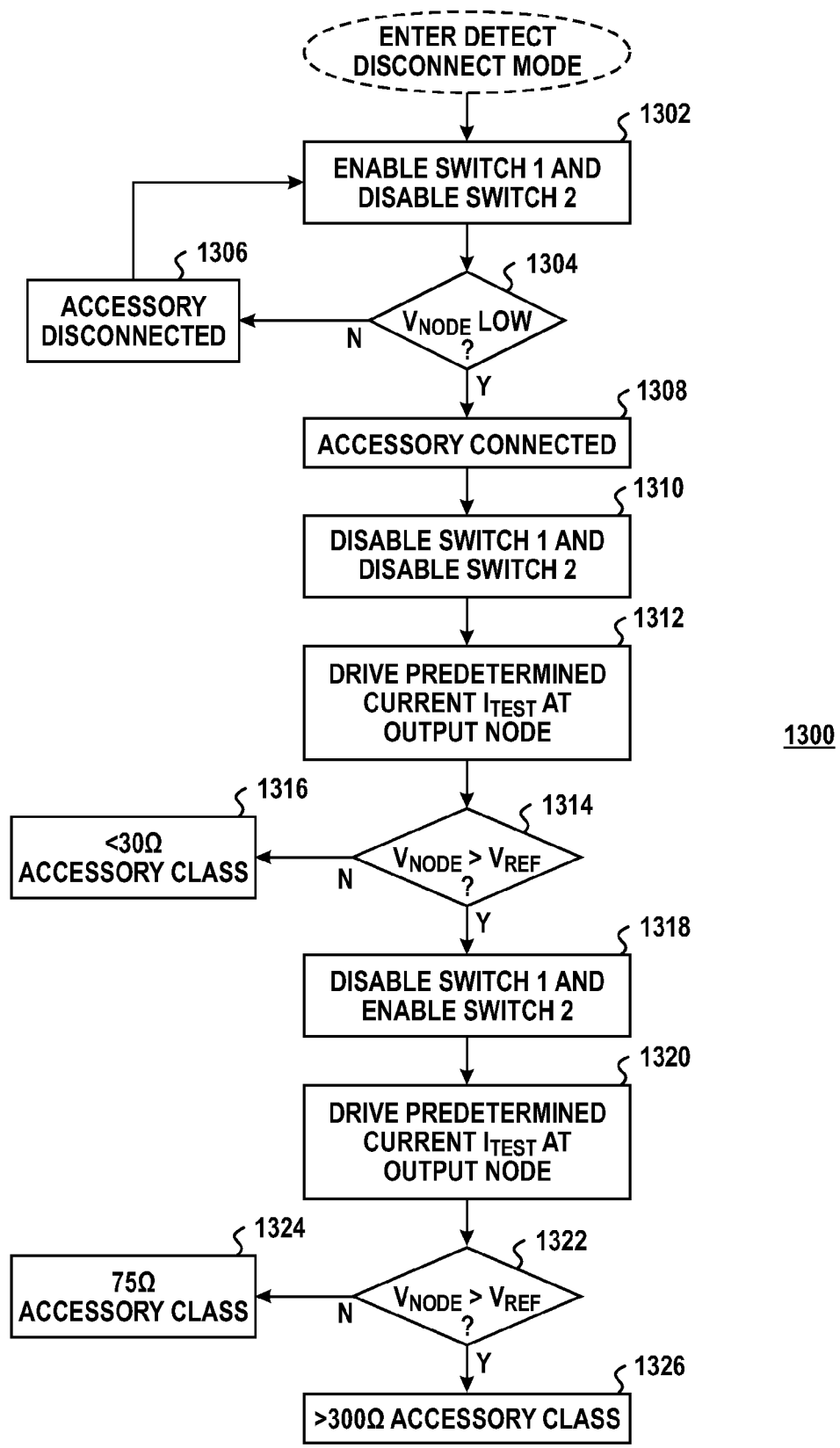
FIG. 13 is a flow diagram illustrating an example method for detecting whether an accessory is connected to a video processing device, and if connected, an accessory class in the context of the display controller implementation of FIG. 12 in accordance with at least one embodiment of the present disclosure.

The display detector 120 includes circuitry for detecting whether a display device is connected to the output display interface 116. In one embodiment, the circuitry of the display detector 120 includes a hardware-implemented state machine configured to implement the techniques described herein. As described in greater detail herein with reference to FIGS. 3 and 4, the display detector 120, in one embodiment, is configured to take advantage of the ability of certain display devices to sample and adjust to a non-zero reference black level on the input video signal so that a fixed offset current can be supplied for the purposes of detecting a disconnection of a display device without incurring visual artifacts in the displayed video content at the display device. As described in greater detail herein with reference to FIG. 5, the display detector 120, in one embodiment, is configured to disable its digital-to-analog converter (DAC) and then drive a fixed current at the output display interface 116 so as to determine whether a display has been connected to the video processing device 102. Further, as described in greater detail with reference to FIGS. 6-9, the display detector 120, in one embodiment, is configured to utilize inactive segments of a video signal output via the output display interface 116 to determine whether a display device is connected to the output display interface 116. FIGS. 10 and 11, as discussed in detail below, illustrate another embodiment of the display detector 120 whereby the display detector 120 is configured to detect whether a display device has been disconnected based the output of a sequence of one or more known pixel values and comparing the resulting voltage at the output display interface to a reference voltage. In the embodiments of FIGS. 12 and 13, the display detector 120 can be configured to detect whether a display device or other accessory device is connected based on the use of one or more resistors that can be selectively connected to an output node of the output display interface 116.

In response to detecting a newly-connected display device, the display detector 120 can provide a connect indicator to the controller 118. In response to the connect indicator the controller 118 can determine certain characteristics of the connected display device, if available, and configure the display controller 112 accordingly. For example, the controller 118 can determine the make, model, or type of display device connected to the output display interface 116 if such information is accessible through additional communication channels with the display device and then load the appropriate device drivers, and, further, can disable any other display connectors and associated circuitry at the video processing device 102. Conversely, in response to detecting a disconnection of a display device from the output display interface 116, the display detector 120 can provide a disconnect indicator to the controller 118. In response to the disconnect indicator, the controller 118 can configure the display controller 112 and other display-related components of the video processing device 102 into a low-power state so as to conserve power. To illustrate, the controller 118 can disable the video encoder 114 and the components of the output display interface 116 while no connection to a display device is detected. Further, the controller 118 can disable a tuner or other input that receives and processes multimedia data for the video processing device 102, unless it would otherwise be desirable to preprocess and store the multimedia data while waiting for a connection to a display device.

When connected, the display devices 104 and 106 each processes signals generated by display controller 112 for presenting a sequence of images (frames or fields) associated with video processing device 102 to a viewer. The display device 104 includes a display input interface 124 compatible with an interface cable 126 or other type of interconnect that can be used to connect the display input interface 124 with the output display interface 116. The display device 106 includes a display input interface 128 compatible with an interface cable 130 that can be used to connect the display input interface 128 with the output display interface 116.

In one embodiment, the terminal resistances of some or all of the signal lines of the output display interface 116, the display input interfaces 124, or the display input interface 128 are substantially equal to a known, or prescribed, terminal resistance (e.g., 75Ω) and various accessory classes of accessory devices potentially connected to the video processing device 102 may have their own known terminal resistances. Accordingly, when the output display interface 116 is not connected to a display device, the effective terminal resistance at the signal line or pin (hereinafter referred to as an "output node") of the output display interface 116 is equal to the terminal resistance of the node of the output display interface 116 itself (e.g., 75Ω). However, when the output display interface 116 is connected to a display device via an interface cable or other connector, the effective terminal resistance at the node of the output display interface 116 is equal to the terminal resistance of the node of the output display interface 116 and the corresponding node of the display input interface in parallel (e.g., 37.5Ω or 75Ω∥75Ω). Thus, given a fixed current provided at the output node of the output display interface 116, the output node will have a higher voltage when the output display interface 116 is not connected to a display device than when the output display interface 116 is connected to a display device.

As described in greater detail herein, the display detector 120 uses the different possible terminal resistances of the output node to determine whether a display device or other accessory device is connected, and in some implementations, what class of accessory is connected. The result then can be used to set either the connect indicator or the disconnect indicator as described above. In the event that a disconnection of a display device is detected, the controller 118 can disable one or more display-related components of the video processing device 102 so as to conserve power.

Figure 2:
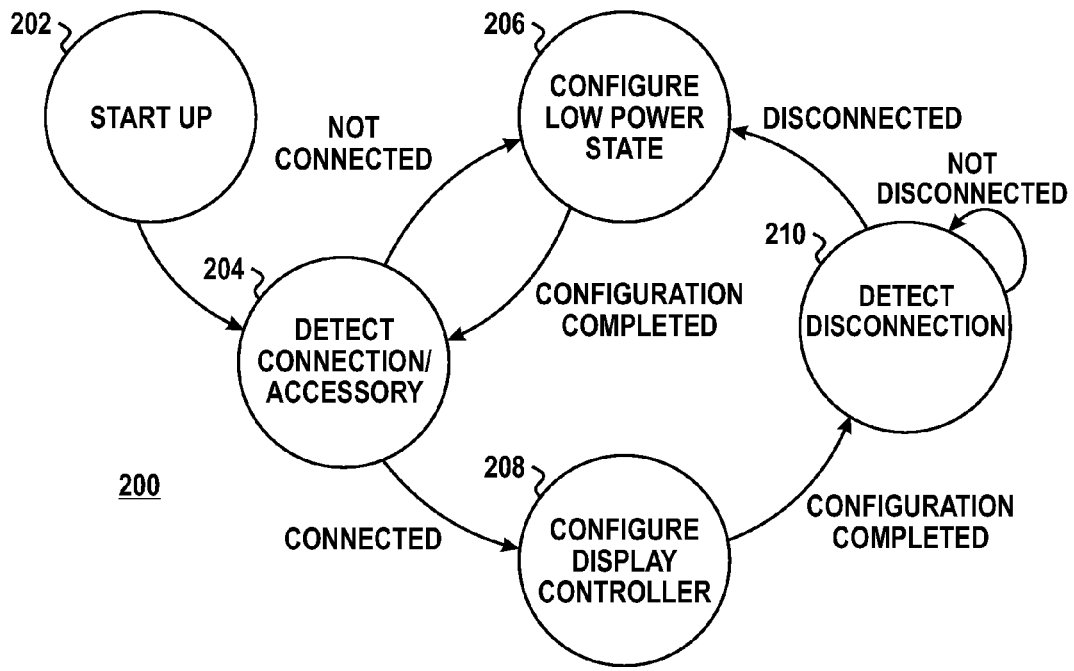
FIG. 2 is a state diagram illustrating an example method for automatic display device connect/disconnect detection in accordance with at least one embodiment of the present disclosure.

Referring to FIG. 2, a state diagram 200 is illustrated in accordance with at least one embodiment of the present disclosure. For ease of discussion, the state diagram 200 is described in the example context of the information handling system 100 of FIG. 1. The state diagram 200 can be implemented as software, firmware, hardware, or a combination thereof. To illustrate, the state diagram 200 can be implemented as a hardware state machine by the display detector 120, the controller 118, or a combination thereof. By implementing a hardware state machine to control the display device connect/disconnect state, performance-degrading and power-sapping intervention by software can be reduced or eliminated.

In response to a start-up or reset stimulus, the state diagram 200 enters state 202 whereby the video processing device 102 is initialized. As part of the initialization process, the display controller 112 can be configured into a default mode whereby the display controller 112 is configured to operate with a default set of display devices. When initialization is completed, the state diagram 200 enters state 204. At state 204 the video processing device 102 determines whether a display device is connected to the output display interface 116. Example techniques for detecting the connection of a display device or other accessory device to the video processing device 102 are described below with reference to FIGS. 5, 12, and 13. In the event that a connection is not detected, the state machine 200 enters state 206. At state 206, the controller 118 configures display-related components of the video processing device 102 into a low power state, such as by disabling the video encoder 114 and a video DAC of the output display interface 116. When the configuration of the low power mode is completed, the state diagram 200 returns to state 204.

In the event that a connection to a display device or other accessory device is detected at state 204, the display detector 120 generates the connect indicator and the state diagram 200 enters state 208. At state 208 the controller 118 can determine the characteristics of the connected display device, if available, and configures the display controller 112 accordingly. This configuration can include enabling previously-disabled components, loading device drivers, and the like. When the configuration has completed, the state diagram 200 enters state 210. At state 210 the display detector 120 determines whether the display device has been disconnected. Example techniques for detecting the disconnection of a display device or other accessory device are described below with reference to FIGS. 4, 7, 8, 11, and 13. In the event that a disconnection is detected, the display detector 120 generates the disconnect indicator and the state diagram 200 reenters state 206.

Figure 3:
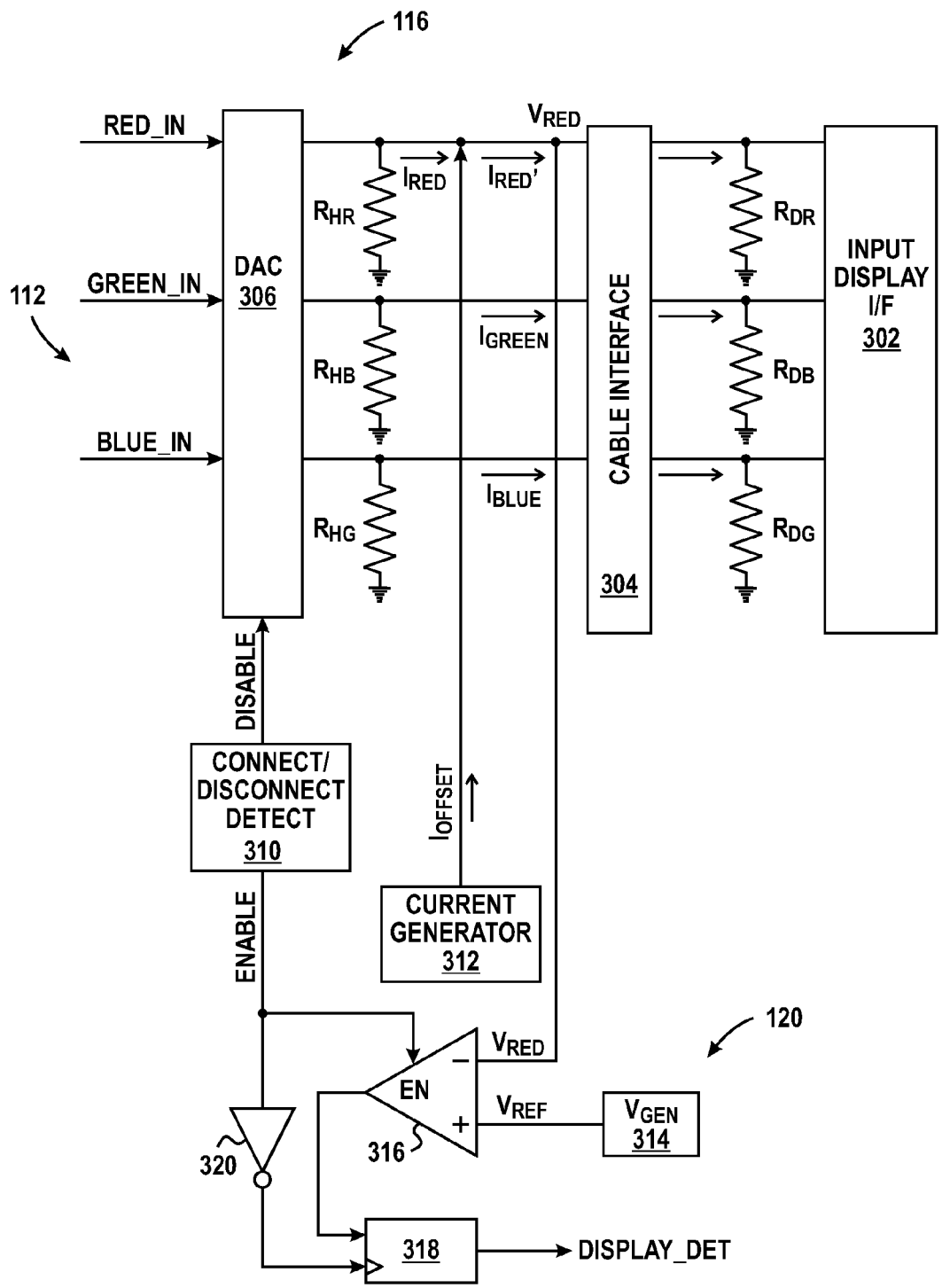
FIG. 3 is a diagram illustrating an example implementation of a display controller of the information handling system of FIG. 1 in accordance with at least one embodiment of the present disclosure.

FIG. 3 illustrates an example implementation of the display controller 112 of FIG. 1 in conjunction with an input display interface 302 of a display device and a cable interface 304 in accordance with one embodiment of the present disclosure. In the example of FIG. 3, the output display interface 116 is utilized to provide component-type video to the display device, such as video signaling based on a Red-Green-Blue (RGB) color space. Accordingly, the output display interface 116 includes a video DAC 306 configured to convert digital pixel values, such as digital pixel streams RED_IN, GREEN_IN, and BLUE_IN (corresponding to the red, green, and blue color component information respectively), to corresponding representative electronic signals transmitted to the input display interface 302 over different corresponding lines of the cable interface 304. In at least one embodiment, the video DAC 306 is a current-steering DAC that generates a current for output that varies with the pixel values of the corresponding input signal.

In the example of FIG. 3, the display detector 120 includes a connect/disconnect detect module 310, an offset current generator 312, a reference voltage generator 314, a comparator 316, and an output latch 318. The connect/disconnect detect module 310 comprises logic and other circuitry configured to provide an enable indicator or enable signal (ENABLE) for latching a DISPLAY_DET signal at the output latch 318 and a disable indicator or disable signal (DISABLE) for disabling at least the video DAC 306.

In operation, the offset current generator 312 provides a fixed offset current $I_{OFFSET}$ to the output node of the output display interface 116 corresponding to a particular color component (e.g., the red color component in the example of FIG. 3) during the transmission of one or more frames of video content (including the inactive segments of the video signal such as the horizontal sync (hsync) and vertical sync (vsync) segments) to the input display interface 302 of the display device. The offset current $I_{OFFSET}$ is combined with the current $I_{RED}$ generated by the video DAC for the red color component resulting in the generation of a combined current $I_{RED'}$ ($I_{RED'}=I_{RED}+I_{OFFSET}$) that results in a corresponding voltage $V_{RED}$ at the corresponding input node of the input display interface 302 of the display device. As the current sourced by the video DAC 306 during certain inactive segments of the video signal typically is close to zero ($I_{RED}$(inactive)=0), the combined current $I_{RED'}$ typically is approximately equal to the offset current $I_{OFFSET}$ ($I_{RED'}$(inactive)=$I_{OFFSET}$).

The output of the current $I_{RED'}$ at the selected output node results in a voltage $V_{RED}$ at the output node that is based on the effective terminal resistance $R_{NODE}$ at the output node. In the event that the display device is not connected, the effective terminal resistance is substantially equal to the terminal resistance of the output display interface 116 at the output node (identified as resistance $R_{HR}$ in FIG. 3), that is, $R_{NODE}=R_{HR}$, and thus the voltage $V_{RED}$ is equal to $I_{RED'}*R_{HR}$. In contrast, when the display device is connected, the effective terminal resistance is substantially equal to the resistance $R_{HR}$ of the video processing device 102 with respect to the output node and the resistance of the display device (identified as resistance $R_{DR}$ in FIG. 3) with respect to the output node in parallel; that is $R_{NODE}=R_{HR}\|R_{DR}$ (where $R_{HR}\|R_{DR}<R_{HR}$), and thus the voltage $V_{RED}$ is equal to $I_{RED'}*(R_{HR}\|R_{DR})$.

In at least one embodiment, the display device includes a monitor or other display device configured to sample the reference black level of an input signal by determining the voltage present on input nodes of the input display interface 302 during inactive segments of the received video signal and to readjust the black level with a corresponding offset voltage using any of a variety of well-known techniques. Accordingly, as the offset current $I_{OFFSET}$ is the only substantial source of current at the output node associated with the red component, and thus the source of the voltage at the input line for the red component of the video signal during the initial inactive segments, the display device samples the voltage ($V_{OFFSET}$) resulting from the offset current $I_{OFFSET}$ as reference black so that the offset current $I_{OFFSET}$ does not affect the image displayed when it is provided in conjunction with the current $I_{RED}$ during the active periods of the video signal, even though the offset current $I_{OFFSET}$ is present in the output current $I_{RED'}$ during the active segments. It will be appreciated that certain types of display devices may not be capable of sampling the offset voltage $V_{OFFSET}$ present during the inactive segments of the video signal as the reference black level and thus the presence of the offset current $I_{OFFSET}$ may affect the display of the video content in these instances. To illustrate, the Video Electronics Standards Association (VESA) Video Signal Standard (VSIS) provides that the RGB values during inactive segments must be at 0.0 Volts (V), and thus monitors compliant with the VESA VSIS standard typically are not required to be configured to sample the offset voltage $V_{OFFSET}$ during the inactive segments as the reference black level for the active segments so that the presence of the offset current $I_{OFFSET}$ in the output current $I_{RED'}$ during the active segments would have the potential to affect the display of video content during the active segments.

Based on the different levels of $V_{RED}$ resulting from the provision of the offset current $V_{OFFSET}$ to the output node during an inactive segment of the video signal and based on the ability of the display device to compensate for the presence of the offset current $I_{OFFSET}$, the display detector 120 can determine whether the display device has been disconnected from the output display interface 116. The comparator 316 compares the voltage $V_{RED}$ at the output node during the inactive segment with a reference voltage $V_{REF}$ output by the reference voltage generator 314, wherein the reference voltage $V_{REF}$ is between the voltage level at the output node expected in the event that a display device is connected and the voltage at the output node expected in the event that a display device is not connected. When an inactive segment (e.g., an hsync or vsync component) that is to serve as the impetus for the detection process is being transmitted via the output node, the connect/disconnect detect module 310 provides the enable indicator so that the output latch 318 latches the output of the comparator 316 at the time of the transmission of the inactive segment, whereby the output of the comparator 316 at this time represents the comparison of the voltage $V_{RED}$ of the output node at the time of transmission of the inactive segment to the voltage reference $V_{REF}$. Thus, in the event that the voltage $V_{RED}$ is greater than the reference voltage $V_{REF}$ (and thus no display device is connected) during the transmission of the inactive segment, the comparator 316 configures its output to a first value (e.g., zero), which is latched by the output latch 318 in response to the enable indicator. In the event that the voltage $V_{RED}$ is less than the reference voltage $V_{REF}$ (and thus a display device is connected) during the transmission of the inactive segment, the comparator 316 configures its output to a second value (e.g., one), which is latched by the output latch 318 in response to the enable indicator. The output of the output latch 318 is provided as a display detect signal (DISPLAY_DET), whereby the DISPLAY_DET signal having the first value and the DISPLAY_DET signal having the second value can serve as the connect indicator and disconnect indicator, respectively, provided to the controller 118 as described above. In the event that the DISPLAY_DET signal is unasserted, or zero, the display device is identified as having been disconnected from the video processing device 102 and thus the connect/disconnect detect module 310 can provide the disable indicator so as to disable the video DAC 306 and other display-related components of the video processing device 102 for at least a predetermined period.

Figure 4:
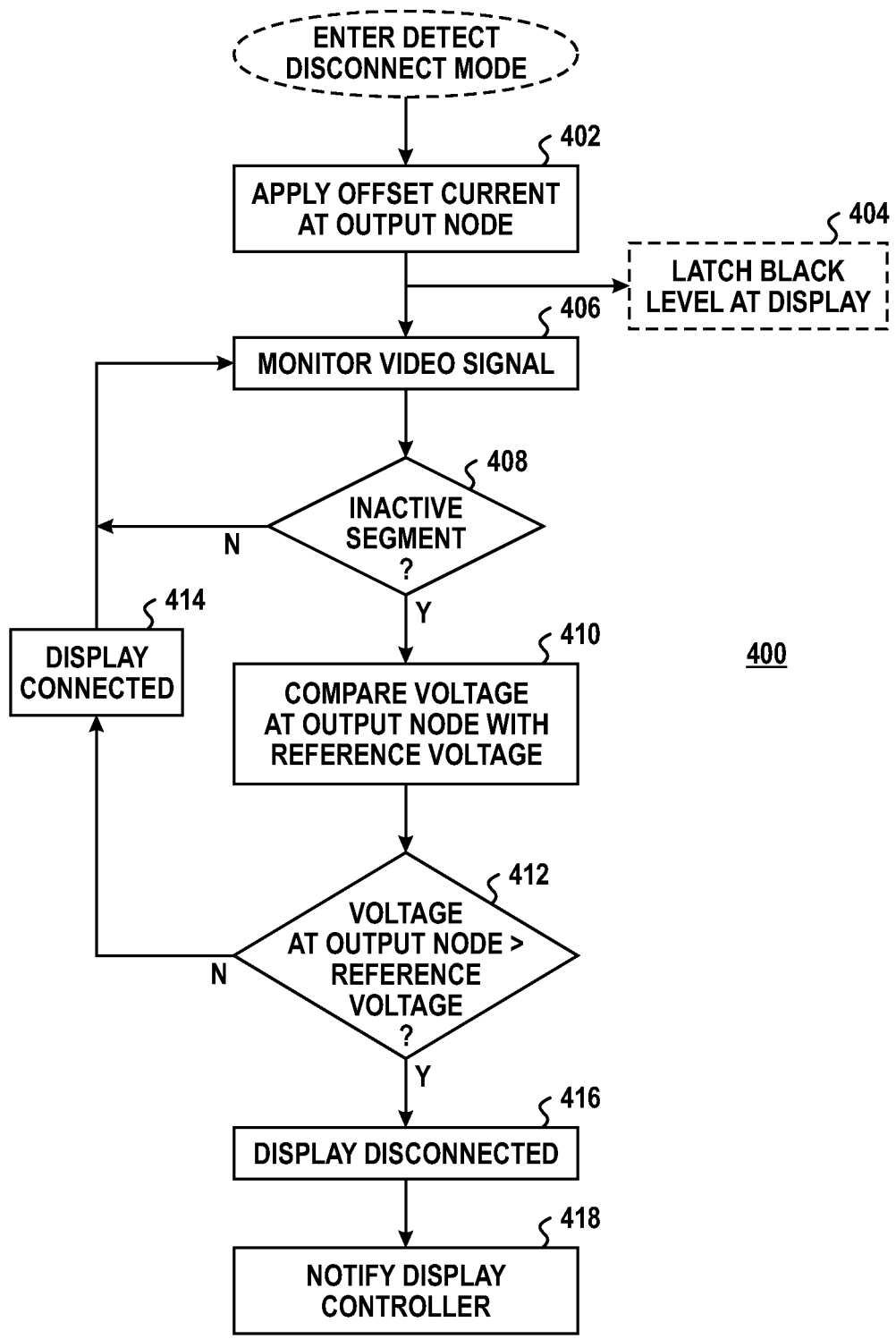
FIG. 4 is a flow diagram illustrating an example method for detecting a disconnection of a display device from a video processing device in the context of the implementation of FIG. 3 in accordance with at least one embodiment of the present disclosure.

FIG. 4 illustrates an example method 400 for determining whether a display device has been disconnected from a video processing device in accordance with at least one embodiment of the present disclosure. For ease of discussion, the method 400 is described in the context of display controller implementation of FIG. 3. The method 400 can represent the operation of the state machine 200 of FIG. 2 for the state 210.

At block 402, the video processing device 102 processes video data and outputs one or more corresponding video signals via the output display interface 116. At least one output current representing a corresponding component of the video signal is augmented at the corresponding output node with the offset current $I_{OFFSET}$ from the offset current generator 312 during the transmission of one or more frames of video content. At block 404, the display device samples the offset voltage $V_{OFFSET}$ present during the inactive segments of the video signal (and generated via the offset current $I_{OFFSET}$) as the reference black level. At block 406, the connect/disconnect detect module 310 monitors the video signal to determine whether there is an upcoming inactive segment of the video signal. In the event that no upcoming inactive segment is detected at block 408, the method 400 returns to block 406 to continue monitoring the video signal. Otherwise, if an upcoming predetermined inactive segment is detected in the video signal (e.g., a preselected vertical synchronization component or horizontal synchronization component), the method 400 continues to block 410. At block 410, the display detector 120 determines the voltage at the output node during the predetermined inactive segment ($V_{NODE}$(inactive)), where the voltage at the output node during the inactive segment is dependent on the offset current $I_{OFFSET}$ and the effective resistance at the output node ($R_{NODE}$), that is: $V_{NODE}$ (inactive)=$I_{OFFSET}*R_{NODE}$. As discussed above, the effective resistance at the output node is lower when a display device (hereinafter, resistance $R_C$) is connected than the effective resistance at the output node when a display device is not connected (hereinafter, resistance $R_D$). Accordingly, at block 412 the comparator 316 compares the voltage $V_{NODE}$ (inactive) with a reference voltage $V_{REF}$, wherein the reference voltage $V_{REF}$ is selected so as to between the voltage $V_C$ expected when a display device is connected ($V_C = I_{OFFSET}*R_C$) and the voltage $V_D$ expected when a display device is not connected ($V_D = I_{OFFSET}*R_D$), that is: $V_C < V_{REF} < V_D$. In the event that the voltage $V_{NODE}$ (inactive) is determined to be less than the reference voltage $V_{REF}$ at block 412, the display detector 120 determines that a display device is connected and therefore generates the connect indicator (e.g., DISPLAY_DET=1) for the controller 118 at block 414 as described above. The method 400 then returns to the block 406 whereupon the process can be repeated for another detection cycle. In the event that the voltage $V_{NODE}$(inactive) is determined to be greater than the reference voltage $V_{REF}$ at block 412, the display detector 120 determines that a display device is not connected at block 416 and therefore notifies the display controller 112 by generating the disconnect indicator (e.g., DISPLAY_DET=0) for the controller 118 as described above. The disconnect indicator can include, for example, an interrupt to be processed by the host processor 108 of the video processing device 102.

Figure 5:
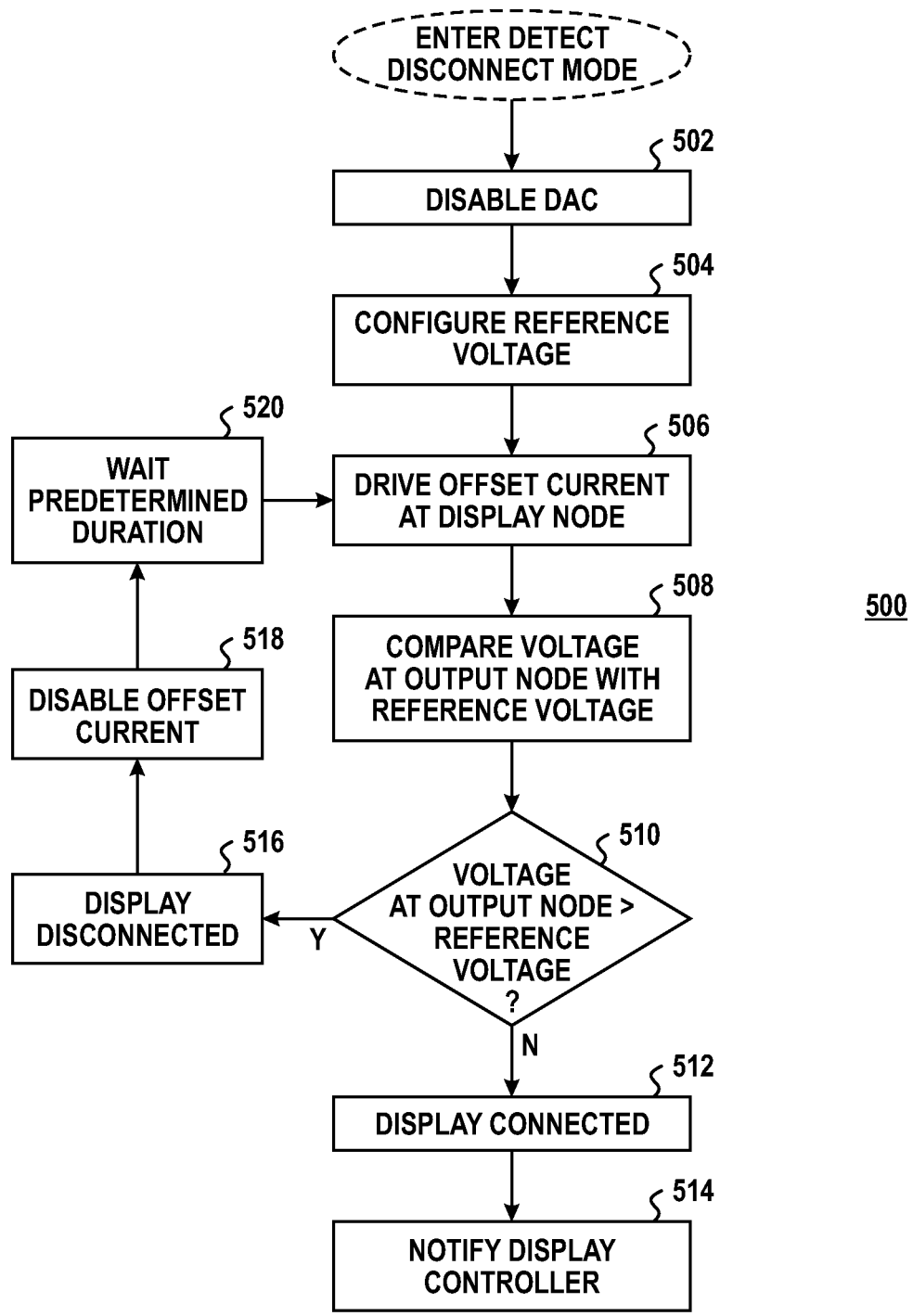
FIG. 5 is a flow diagram illustrating an example method for detecting a connection of a display device to a video processing device in the context of the display controller implementation of FIG. 3 in accordance with at least one embodiment of the present disclosure.

FIG. 5 illustrates an example method 500 for determining whether a display device has been connected to, or disconnected from, a video processing device in accordance with at least one embodiment of the present disclosure. For ease of discussion, the method 500 is described in the context of display controller implementation of FIG. 3. The method 500 can represent the operation of the state machine 200 of FIG. 2 for the state 204.

At block 502, the connect/disconnect detect module 310 disables the video DAC 306 as well as other display-related components. At block 504 the connect/disconnect detect module 310 configures the voltage generator 314 to output a reference voltage $V_{REF}$ related to the offset current $I_{OFFSET}$ and the node resistances when a display device is connected or disconnected as described above. At block 506, the connect/disconnect detect module 310 enables the offset current generator 312 (if previously disabled) so as to drive the offset current $I_{OFFSET}$ to the output node of the corresponding color component of the video signal. Accordingly, a voltage $V_{NODE}$ results from the conductance of the offset current $I_{OFFSET}$ through the node resistance $R_{NODE}$ of the output node, where the node resistance is higher if a display device is not connected and lower if a display device is connected. At block 508 the comparator 312 compares the voltage $V_{NODE}$ with the reference voltage $V_{REF}$. In the event that it is determined at block 510 that the voltage $V_{NODE}$ is less than the reference voltage $V_{REF}$, the display detector 120 determines that a display device has been connected at block 512 and therefore notifies the display controller 112 by generating the connect indicator (e.g., DISPLAY_DET=1).

Otherwise, the display detector 120 determines that a display device has not been connected at block 516 and therefore maintains or provides the disconnect indicator. Further, to conserve power in between iterations of the display connection process, at block 518, the connect/disconnect detect module disables the offset current generator 312, if not already disabled, and at block 520 the display detector 120 maintains the offset current generator 312 in a disabled state for a predetermined duration (e.g., 1 second). The predetermined duration can be hardwired, or the predetermined duration can be programmed via, for example, a value stored to a particular memory location or register or via a resistor, jumper, or fuse. Further, the predetermined duration can be incremented, decremented, or otherwise adjusted between iterations. After the predetermined duration has lapsed, the method 500 returns to block 506 to repeat the process for the next detection cycle.

Figure 6:
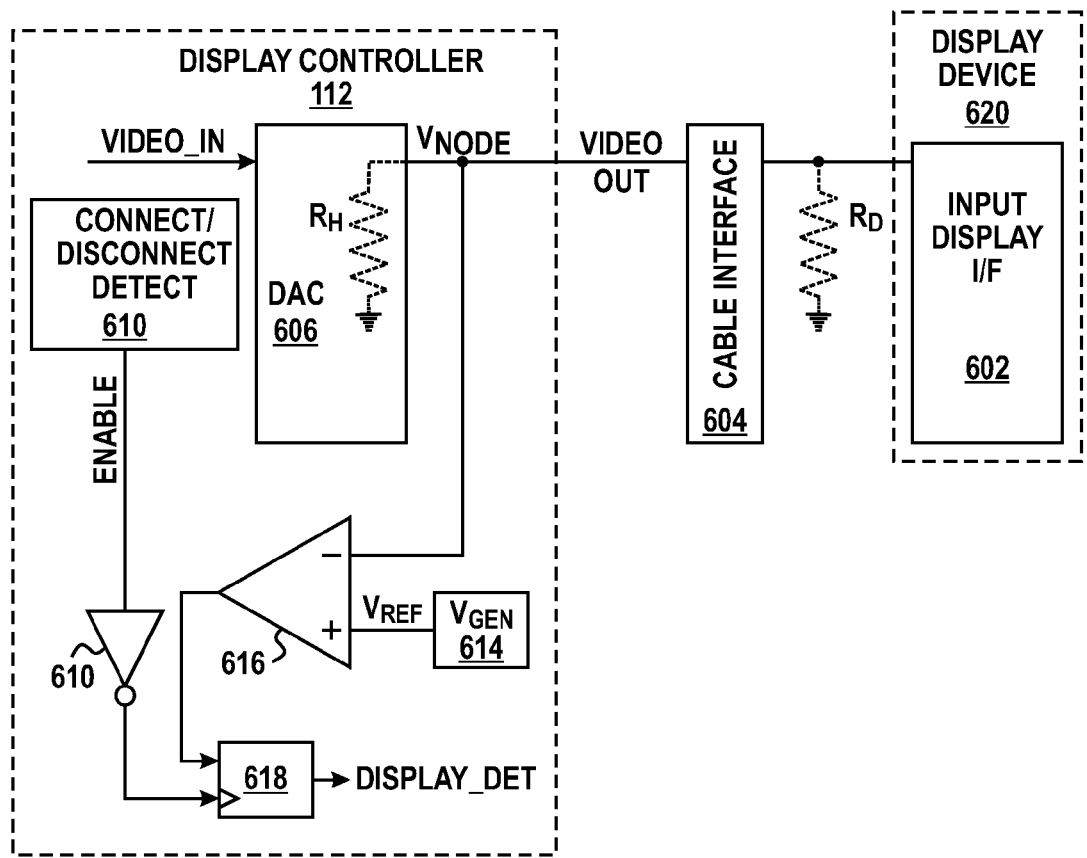
FIG. 6 is a diagram illustrating another example implementation of a display controller of the information handling system of FIG. 1 in accordance with at least one embodiment of the present disclosure.

FIG. 6 illustrates another example implementation of the display controller 112 of FIG. 1 in conjunction with an input display interface 602 of a display device 620 and a cable interface 604 in accordance with one embodiment of the present disclosure. In the example of FIG. 6, the output display interface 116 is utilized to provide a composite-type video to the display device 620. The output display interface 116 includes a video DAC 606 configured to convert the composite digital video signals into a representative analog signal transmitted to the input display interface 602 over a corresponding line of the cable interface 604. In at least one embodiment the video DAC 606 is a current-steering DAC that generates a current for output that varies with the digital values of the corresponding input signal.

In the example of FIG. 6, the display detector 120 includes a connect/disconnect detect module 610 (corresponding to the connect/disconnect detect module 310 of FIG. 3), a reference voltage generator 614 (corresponding to the reference voltage generator 314 of FIG. 3), a comparator 616 (corresponding to the comparator 316 of FIG. 3), and an output latch 618 (corresponding to output latch 318 of FIG. 3). The connect/disconnect detect module 610 monitors the operation of the output display interface 116 to identify an upcoming inactive segment of the video signal output by the video DAC 606 with predetermined voltage/current characteristics. In response to detecting an upcoming inactive segment, the connect/disconnect detect module 610 provides an enable indicator.

A current generated by the video DAC 606 for the inactive component ($I_{INACTIVE}$) is transmitted to the corresponding input node of the input display interface 602 of the display device 620 during the transmission of the inactive component, which results in a voltage $V_{NODE}$ at the output node that is based on the effective terminal resistance ($R_{NODE}$) at the output node. In the event that the display device 620 is not connected, the effective terminal resistance is substantially equal to the terminal resistance of the output display interface 116 at the output node (identified as resistance $R_H$ in FIG. 6) and thus the voltage $V_{NODE}$ is equal to $I_{INACTIVE}*R_H$. In contrast, when the display device 620 is connected, the effective terminal resistance is substantially equal to the resistance $R_H$ of the video processing device 102 with respect to the output node and the resistance of the display device 620 (identified as resistance $R_D$ in FIG. 6) with respect to the output node in parallel, that is $R_{NODE}=R_H\|R_D$ (where $R_H\|R_D<R_H$), and thus the voltage $V_{NODE}$ is equal to $I_{INACTIVE}*(R_H\|R_D)$.

In response to the enable indicator, the comparator 616 compares the voltage at the selected output node (voltage $V_{NODE}$) with a reference voltage $V_{REF}$ output by the reference voltage generator 614. In the event that the voltage $V_{NODE}$ is greater than the reference voltage $V_{REF}$ (and thus no display device is connected), the comparator 616 configures its output to a first value (e.g., zero), which is latched by the output latch 618 in response to the enable indicator. In the event that the voltage $V_{NODE}$ is less than the reference voltage $V_{REF}$ (and thus a display device is connected), the comparator 616 configures its output to a second value (e.g., one), which is latched by the output latch 618 in response to the enable indicator. The output of the output latch 618 is provided as the DISPLAY_DET signal and provided to the controller 118 as described above.

Figure 7:
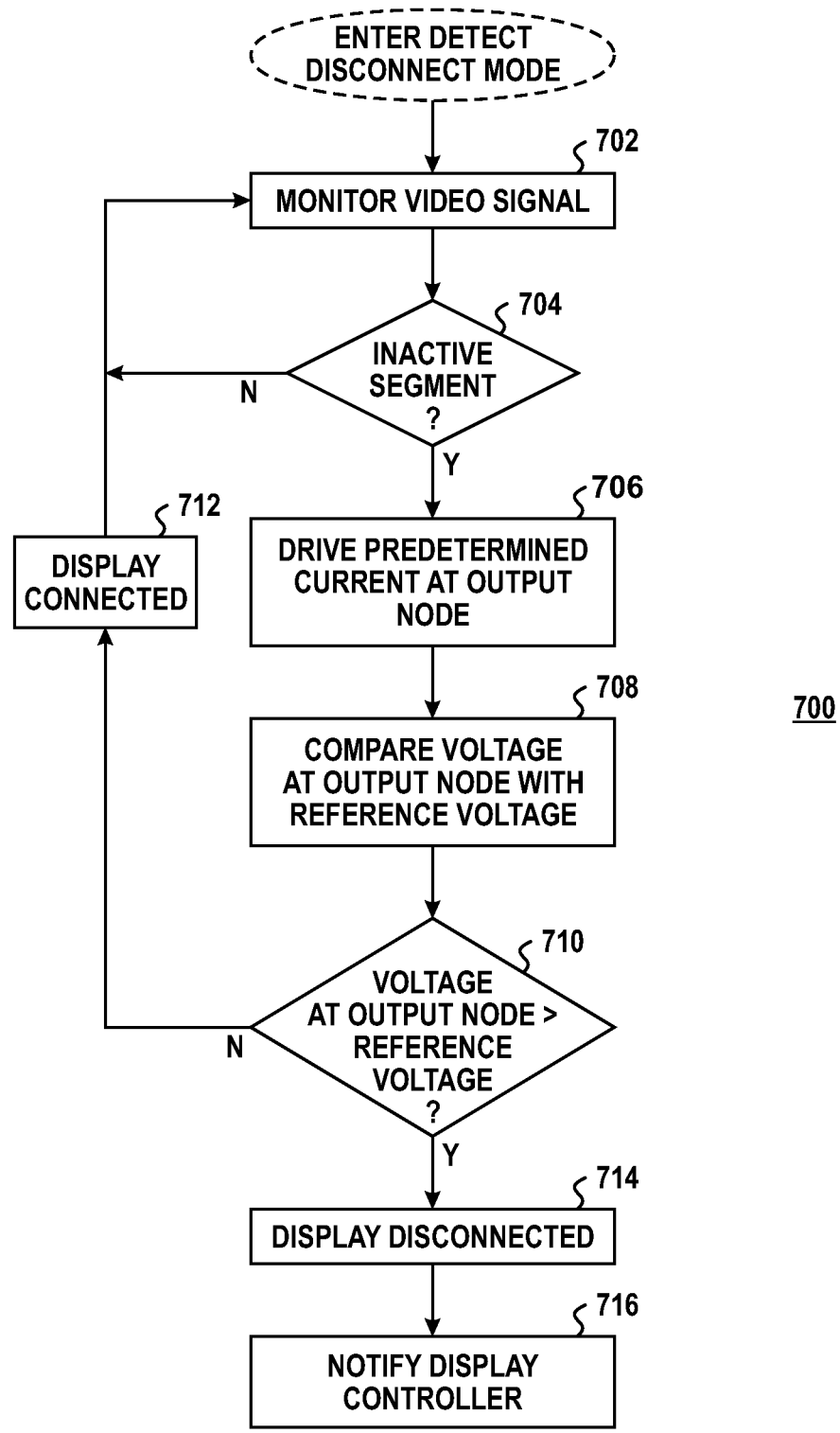
FIG. 7 is a flow diagram illustrating an example method for detecting a disconnection of a display device from a video processing device in the context of the display controller implementation of FIG. 6 in accordance with at least one embodiment of the present disclosure.

FIG. 7 illustrates an example method 700 for determining whether a display device has been connected to a video processing device in accordance with at least one embodiment of the present disclosure. For ease of discussion, the method 700 is described in the context of display controller implementation of FIG. 6. The method 700 can represent the operation of the state machine 200 of FIG. 2 for the state 210.

At block 702, the connect/disconnect detect module 610 monitors the video signal to identify an upcoming inactive segment, such as a vsync component or an hsync component. In the event that the inactive segment is not yet detected at block 704, the method 700 returns to block 702. Otherwise, if the inactive segment is detected in the video signal, at block 706 the video DAC 606 drives a predetermined current $I_{INACTIVE}$ representative of at least a portion of the inactive segment to the output node, thereby generating a voltage $V_{NODE}$ at the output node during the transmission of the inactive segment. Further at block 706, the connect/disconnect detect module 610 provides the enable indicator. At block 706, the comparator 616 compares the voltage $V_{NODE}$ with a reference voltage $V_{REF}$, wherein the reference voltage $V_{REF}$ is selected so as to between the voltage $V_C$ expected when a display device is connected ($V_C=I_{INACTIVE}*R_C$) and the voltage $V_D$ expected when a display device is not connected ($V_D=I_{INACTIVE}*R_D$), that is: $V_C<V_{REF}<V_D$. In the event that it is determined at block 710 that the voltage $V_{NODE}$ is less than the reference voltage $V_{REF}$, the display detector 120 determines that a display device remains connected at block 712, whereupon the method 700 can return to block 702 to repeat the process for the next detection cycle. Otherwise, the display detector 120 determines that a display device has been disconnected at block 714 and therefore notifies the display controller 714 of the disconnection of the display device at block 716 by, for example, generating an interrupt or by providing the DISPLAY_DET signal latched at the output latch 618 in response to the enable indicator from the connect/disconnect detect module 610 provided at block 706.

Figure 8:
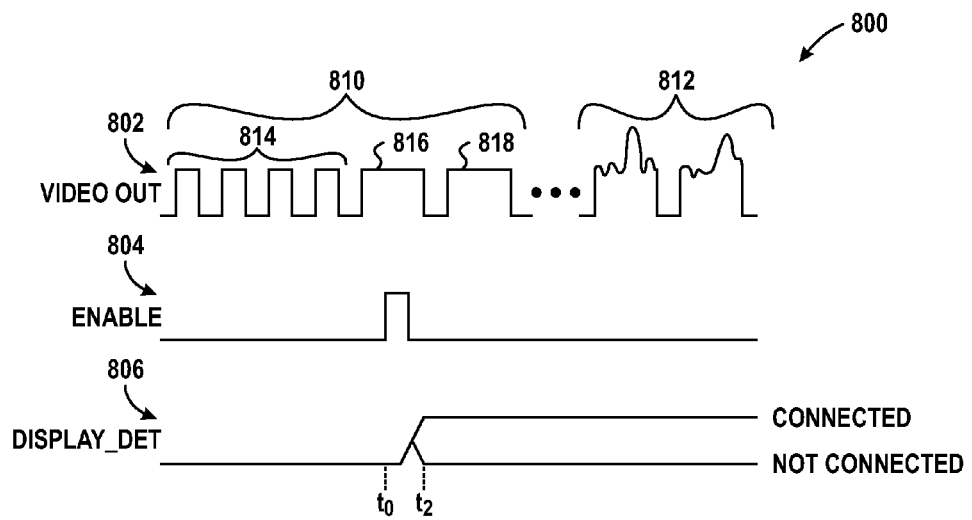
FIG. 8 is a timing diagram illustrating an example operation of the display controller implementation of FIG. 6 in accordance with at least one embodiment of the present disclosure.

FIG. 8 illustrates an example timing diagram 800 for the video signal (signal 802) output by the video DAC 606 of FIG. 6, the enable indicator (signal 804) output by the connect/disconnect detect module 610, and the DISPLAY_DET indicator (signal 806) output by the output latch 618 of FIG. 6. The same timing principles can also be applied in the implementation of FIG. 5.

As illustrated by FIG. 8, the video signal (signal 802) comprises a sequence of inactive segments 810 and active segments 812, whereby the inactive segments 810 carry non-pixel information (such as serration pulses 814 serving as a preamble and vertical sync components 816 and 818) and the active segments 812 carry pixel information. In the depicted example, the connect/disconnect detect module 610 detects the serration pulses 814 and thus determines that a vertical sync component is upcoming. Once the selected vertical sync component is detected (the vertical sync component 816 in this example), the connect/disconnect detect module 610 pulses the enable indicator at time $t_0$, thereby enabling the comparator 616 and other circuitry of the display detector 120. By time $t_2$ the comparator 616 has compared the voltage at the output node generated from the fixed current output based on the voltage of the vertical sync component 816 and determined whether the voltage at the output node is greater than or less than the reference voltage $V_{REF}$. The comparator 616 configures its output accordingly and the configured output is reflected by the state of the DISPLAY_DET signal at time $t_2$.

Figure 9:
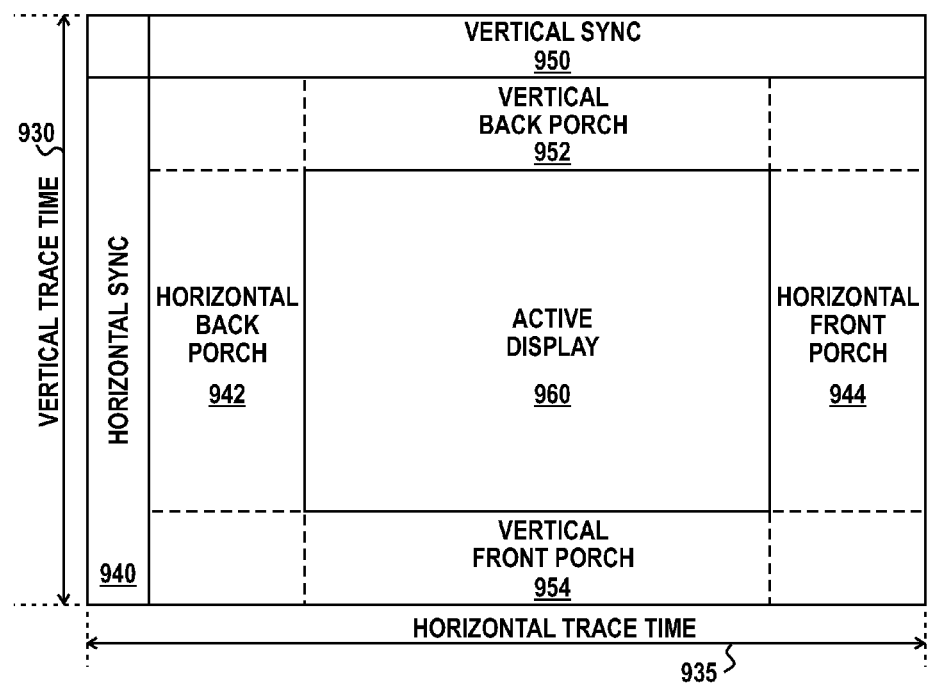
FIG. 9 is a diagram illustrating display modes associated with a horizontal trace time and a vertical trace time of a signal provided to a display device in accordance with at least one embodiment of the present disclosure.

FIG. 9 is a diagram illustrating portions of time associated with a display of a single frame on a display device in accordance with at least one embodiment of the present disclosure. Time identified from left to right indicates an amount of time for a single horizontal trace (horizontal trace time 935). Time indicated from top to bottom indicates an amount of time to complete a vertical trace (vertical trace time 930). It should be noted that a single vertical trace time 930 is composed of multiple horizontal trace times 935. A portion of time indicated by horizontal sync time 940 indicates time used for transmission of a horizontal sync component to a display device. The horizontal sync component indicates a new horizontal trace is to begin. After receipt of the horizontal sync component, the external display device prepares to draw a new horizontal line on the screen. The amount of time indicated by the horizontal back porch time 942 indicates time before an active video portion is to be displayed (as indicated by active display time 960). The active display time 960 is representative of an image to be displayed. Similarly, the horizontal front porch time 944 indicates the portion of time devoted to a horizontal trace after the active display portion has been completed.

The vertical sync time 950 indicates a portion of the vertical time in which a vertical synchronization component is sent to the external display device. Upon receipt of the vertical synchronization component, the display device prepares to display a new horizontal line at the top of the screen. The vertical back porch time 952 indicates a portion of time in which horizontal lines are drawn before horizontal lines which include the active display portion are received. Similarly, the vertical front porch time 954 includes a portion of time in which horizontal lines are drawn after horizontal lines no longer include an active display portion.

As previously discussed, the present disclosure includes providing fixed current to the video signals output to the display device to assist in the detection of a connection and disconnection of the external display device. To avoid corruption of pixel information made visible to a user, in one embodiment the provision of the fixed current and the detection of the voltage at the output node of the output display interface is performed only during an inactive component of the video signal. To illustrate, the provision of the fixed current for display device detection purposes can occur during any of the porch times 942, 944, 952, 954, during any of the vertical sync time 950, the horizontal sync time 940, or a combination thereof. It should be noted that portions of the vertical back porch time 952, the vertical front porch time 954, the horizontal back porch time 942, and the horizontal front porch time 944 can be displayed on the screen associated with the display device. However, portions of the vertical porches 952 and 954 and the horizontal porches 942 and 944 are generally displayed in black. Accordingly, in this instance the display detection technique described herein can be limited to the sync times 940 and 950 and the black portion of the porch times 942, 944, 952, and 954 so as to reduce visible artifacts during the detection process.

FIG. 10 illustrates an example implementation of the display controller 112 of FIG. 1 in conjunction with an input display interface 1002 of a display device 1003 and a cable interface 1004 in accordance with one embodiment of the present disclosure. In the example of FIG. 10, the output display interface 116 is utilized to provide component-type video to the display device, such as video signaling based on a Red-Green-Blue (RGB) color space. Accordingly, the output display interface 116 includes a video DAC 1006 configured to convert digital video signals, such as digital signals RED_IN, GREEN_IN, and BLUE_IN (corresponding to the red, green, and blue color component information respectively), to corresponding representative electronic signals transmitted to the input display interface 1002 over different corresponding lines of the cable interface 1004. In at least one embodiment, the video DAC 1006 is a current-steering DAC that generates a current for output that varies with the digital pixel values of the corresponding component of the video signal.

In the illustrated embodiment, the display detector 120 includes a connect/disconnect detect module 1010, a reference voltage generator 1014, a comparator 1016, and an output latch 1018 as similarly described above with respect to FIGS. 3 and 6. The display detector 120 further includes a threshold register 1022, a digital comparator 1024, a counter 1026, a delay register 1028, and an inverter 1030. The connect/disconnect detect module 1010 comprises logic and other circuitry configured to provide an enable indicator or signal (ENABLE) for latching a DISPLAY_DET signal at the output latch 1018, a disable indicator or signal (DISABLE) for disabling at least the video DAC 1006, and a voltage configuration indicator or signal (VCONFIG) to configure the reference voltage $V_{REF}$ output by the voltage generator 1014. The connect/disconnect detect module 1010 further can include logic and other circuitry to provide a threshold value for storage in the threshold register 1022 and a delay value for storage in the delay register 1028.

In operation, the comparator 1016 compares a voltage $V_{BLUE}$ at the output node of the output display interface 116 for the blue component with the reference voltage $V_{REF}$ when a compare indicator (CMP) is provided (e.g., an assertion of a compare signal), and outputs a value representing the results of the comparison to the output latch 1018, whereupon the output latch 1018 latches the output voltage of the comparator 1016 as the DISPLAY_DET signal in response to assertion of the enable signal by the connect/disconnect detect module 1010. The digital comparator 1024 compares the digital pixel values provides as the BLUE_IN component to the threshold value of the threshold register 1022, and when a digital pixel value exceeds the threshold value, the digital comparator 1024 asserts its output.

In one embodiment the output of the digital comparator 1024 can serve as the compare indicator such that when a single digital pixel value is detected as meeting or exceeding the threshold value, the compare indicator is asserted and the comparator 1016 performs the above-described comparison. However, as discussed in greater detail below, to allow the output current of the video DAC 1006 to settle, in another embodiment, the counter 1026 is used to ensure that a minimum uninterrupted sequence of digital pixel values greater than the threshold value occur in the BLUE_IN component before the comparison is initiated. In this case, the counter 1026 is loaded with the delay value (which represents the minimum number of display values in the sequence) as the initial counter value and then the counter 1026 decrements the counter value for each digital pixel value that meets or exceeds the threshold value (as determined by the digital comparator 1024). When the counter value reaches zero, the counter 1026 then asserts the compare indicator to direct the comparator 1016 to initiate the comparison process. To ensure that the sequence of digital pixel values that meet or exceed the threshold value is contiguous, the inverter 1030 can be used to reset the counter 1026 whenever a digital pixel value is determined to not meet or exceed the threshold value. To illustrate, assuming the delay value is set to 8, the compare indicator would not be asserted until eight digital pixel values that meet or exceed the threshold value are provided in an uninterrupted sequence in the BLUE_IN component. Care may be taken to ensure that the delay value, and thus the number of digital pixel values in the uninterrupted sequence, is reasonable in the context of the video content expected to be displayed.

As discussed above, the terminal resistance at the output node of each of the color components differs depending on whether a display device is connected or disconnected to the output display interface 116. To illustrate, if the output display interface 116 has an effective resistance of 75Ω at each output node and the display device has an effective resistance of 75Ω for each input node, the output node has a terminal resistance of 75Ω when the display device is disconnected and a terminal resistance of 37.5Ω when the display device is connected. Accordingly, for a given output current, the voltage at an output node will be lower when the display device is connected than when the display device is disconnected. The implementation of the display controller 112 of FIG. 10 takes advantage of the difference in voltages at the output node depending on whether a display device is connected or disconnected by selecting a reference voltage $V_{REF}$ that is greater than the highest voltage expected at the output node when the display device 1003 is connected but is lower than the highest voltage expected at the output node when the display device 1003 is disconnected. Accordingly, when the voltage $V_{BLUE}$ is less than or equal to the reference voltage $V_{REF}$ when the compare indicator is asserted, the DISPLAY_DET signal would be set to 1, thereby indicating the display device 1003 is connected. Otherwise, when the voltage $V_{BLUE}$ is greater than the reference voltage $V_{REF}$ when the compare indicator is asserted, the DISPLAY_DET signal would be set to 0, thereby indicating the display device 1003 is disconnected.

To illustrate, assuming that a current range of 0 mA to 18.666 mA for the video DAC 1006 depending on the output pixel value, the normal voltage range of the video DAC 1006 would be 0.0 V to 0.7 V for a terminal resistance of 37.5Ω (i.e., when the display device 1003 is connected) and would be 0.0V to 1.4 V for a terminal resistance of 75Ω (i.e., when the display device 1003 is disconnected). In this example, the reference voltage $V_{REF}$ could be set to, for example, 0.8 V. In this case, the reference voltage $V_{REF}$ would only be exceeded when the output of the video DAC 1006 is at or greater than 10.666 mA (0.8 V/75Ω) when the display device 1003 is disconnected. Further, the output of 10.666 mA would result in a voltage of only 0.4 V when the display device 1003 is connected, and thus would not exceed the reference voltage of 0.8 V. Assuming the video DAC 1006 is a 10 bit DAC with the 0 to 18.666 mA current range, the current per digital step is 18.23 uA/step. Accordingly, to output a current of at least 10.666 mA, the digital pixel value input to the video DAC 1006 would have to be at least 586 or greater. Allowing a margin for error and noise, a threshold value slightly greater than 586, such as 650 (out of 1023) could be loaded into the threshold register 1022. Accordingly, whenever a digital pixel value of 650 or greater is supplied in the BLUE_IN component, the digital comparator 1024 would assert its output, which could then trigger the comparator 1016 to compare the voltage $V_{BLUE}$ at the output node resulting from the supply of the current corresponding to the digital pixel value to the 0.8 V reference voltage. Alternately, to allow the output of the video DAC 1006 to settle, the counter 1026 can be used to ensure that an uninterrupted sequence of digital pixel values of 650 or greater occurs in the BLUE_IN component before beginning the comparison process. In this example a digital pixel value of 650 would be converted by the video DAC 1006 to a current of 11.849 mA, which would result in a voltage $V_{BLUE}$ of 0.888 V if the display device 1003 is disconnected or a voltage $V_{BLUE}$ of 0.444 V if the display device 1003 is connected. Thus, in this example the comparison of the voltage $V_{BLUE}$ to the 0.8 V reference voltage for the current output of the video DAC 1006 corresponding to a digital pixel value of 650 (or an uninterrupted sequence of such values) would allow the display detector 120 to determine whether the display device 1003 is connected or disconnected.

In an alternate embodiment, rather than employing a maximum expected voltage for comparison purposes, different voltage ranges depending on whether the display device 1003 is connected or disconnected can instead be implemented. To illustrate, assuming that the output voltage of the video DAC 1006 is in a range of 0.0 V to 0.7 V when the display device 1003 is connected, the reference voltage $V_{REF}$ could be set to, for example, 0.5 V and the digital comparator 1024 could be configured to detect digital pixel values that would result in an output voltage of approximately 0.3 V to 0.4 volts when the display device 1003 is connected and an output voltage of approximately 0.6 V to 0.8 V when the display device 1003 is not connected. When one of these digital pixel value (or a set of these digital pixel values) is detected, a comparison of the voltage at the output node to the 0.5 V reference voltage to determine whether the display device 1003 is connected or disconnected.

Further, in one embodiment, rather than concluding that the display device 1003 is disconnected based on one indication that the display device 1003 is disconnected, the connect/disconnect detect module 1022 could implement a counter (not shown) or other mechanism to ensure that a programmable number of disconnect indications from the comparator 1016 occur before asserting the enable signal so as to latch the DISPLAY_DET signal. Further, rather than utilizing only one component of the video signal to determine whether the display device 1003 is connected or disconnected, the display controller 112 could employ the illustrated technique for two or more of the components (e.g., for each of the red, green, and blue components) of the video signal and then conclude that the display device 1003 is connected or disconnected based on the connect/disconnect status reported by each component (e.g., either by majority vote or by unanimous vote).

Although FIG. 10 illustrates an implementation whereby the video signal is separated into different components (e.g., RGB components or luma-chroma components), the implementation may be adapted for analog TV signals. In this case, the reference voltage $V_{REF}$ would be set at a voltage greater than the maximum expected voltage of the analog TV signal when the display device 1003 is connected.

FIG. 11 illustrates an example method 1100 for determining whether a display device has been disconnected from a video processing device in accordance with at least one embodiment of the present disclosure. For ease of discussion, the method 1100 is described in the context of display controller implementation of FIG. 10. The method 1100 can represent the operation of the state machine 200 of FIG. 2 for the state 210.

At block 1102, the connect/disconnect detect module 1010 initializes the display detector 120 to determine the connection state of the display device 1003 by determining a threshold value and a display value and then storing them in the threshold register 1022 and the delay register 1028, respectively. As discussed above, the threshold value can be determined based on a maximum expected voltage at an output node of the output display interface 116 when the display device is connected (e.g., the 0.8 V reference voltage discussed in an example above), or based on a voltage range (e.g., the 0.5 V reference voltage discussed in an example above). Likewise, the delay value can be selected so as to provide sufficient settling of the output current of the video DAC 1006. The counter 1026 stores the delay value as its counter value.

At block 1104, the digital comparator 1024 monitors the digital values representing the pixel data for the corresponding component (e.g., the BLUE_IN component) and compares the digital values with the threshold value. In the event that the digital comparator 1024 determines that the pixel value is not greater than the threshold value at block 1106, the counter 1026 is reinitialized and the method 1100 returns to block 1104 for the next pixel value. Otherwise, at block 1108, the digital comparator 1024 asserts its output and the counter 1026 therefore modifies its counter value (e.g., decrements its counter value).

At block 1110, the counter 1026 determines whether its counter value equals a settle value. In instances where the counter 1026 is a decrement counter initialized with the delay value, the settle value can be zero. Alternately, if the counter 1026 is an increment counter initialized with a counter value of zero, the settle value can be, for example, the delay value. In the event that the counter value has not yet reached the settle value, the method 1100 returns to block 1104 for the next pixel value. Otherwise, if the counter value has reached the settle value, the counter 1026 asserts the compare indicator, thereby directing the comparator 1016 to compare the voltage $V_{BLUE}$ at the output node with the reference voltage $V_{REF}$ at block 1112. If the voltage $V_{BLUE}$ is less than the reference voltage $V_{REF}$, at block 1116 the display detector 120 identifies the display device 1003 as still connected and the method 1100 returns to block 1102 for the next detection cycle. Otherwise, if the voltage reference $V_{BLUE}$ is equal to or greater than the reference voltage $V_{REF}$, at block 1118 the display detector 120 identifies the display device 1003 as disconnected and at block 1120 the display detector 120 notifies the display controller 112 (e.g., by deasserting the DISPLAY_DET signal or by issuing an interrupt). In an alternate embodiment, the display detector 120 could be implemented for each component of the video signal and the display controller 112 therefore could poll each display detector 120 to determine whether the display device 1003 is disconnected based on the indication from each display detector 120. Further, the display controller 112 may wait until the display device 1003 has been detected as disconnected for a minimum number of detection cycles before identifying the display device 1003 as disconnected and taking action accordingly.

From the above description, it will be appreciated that the implementation of the display controller 112 of FIG. 10 and its example method 1100 of operation offer a number of advantages. For one, rather than requiring an additional current source for purposes of display connect/disconnect, the video DAC 1006 (FIG. 10) can be used for display connection/disconnection detection purposes in addition to driving the normal video signals as described above. This implementation also does not require additional external logic. Further, by passively monitoring the voltage output node of the output display interface and comparing the monitored voltage with a threshold expected to differentiate between a display connected condition and a display disconnected condition, the implementation of FIGS. 10 and 11 does not introduce visible artifacts at the display device 1003 because the output to the display device 1003 is not altered in implementing the display detection/disconnection process.

FIG. 12 illustrates an example implementation of the display controller 112 of FIG. 1 in conjunction with an accessory connector 1216 (one example of the output display interface 116 of FIG. 1) for coupling to an accessory device 1203. In one embodiment, the display controller 112 is implemented as an integrated circuit comprising a video DAC 1206, an accessory detector 1206 (corresponding to the device detector 106, FIG. 1), and an application processor 1220. The output node of the video DAC 1206 is connected to the accessory connector 1216 via a pin 1218 of the integrated circuit.

The application processor 1220 is configured to process multimedia data provided by the video processing device 102 (FIG. 1) and provide the video content (VIDEO) for output via the video DAC 1206 via the accessory connector 1216. In the depicted example, the video content is provided as a composite signal, such as an NTSC or PAL signal. In other embodiments, the illustrated technique can be adapted for use with one or more components of a component-based video signal.

The accessory detector 1206 includes a connect/disconnect detect module 1210, a voltage generator 1214, a comparator 1216, an application processor 1220, a pull-up resistor 1222, and a switch 1224 (also identified herein as "switch 1"). The illustrated implementation further includes a resistor 1226 and a switch 1228 (also identified herein as "switch 2"). The voltage generator 1214 is configured to provide a reference voltage $V_{REF}$ configurable by a VCONFIG signal. The comparator 1216 includes an input connected to the output (output node) of the video DAC 1206, an input connected to the voltage generator 1214 to receive the voltage reference $V_{REF}$ and an output connected to the connect/disconnect detect module 1210. The resistor 1222 includes a first terminal connected to a voltage reference $V_{DD}$ and a second terminal. The switch 1224 includes a first terminal connected to the second terminal of the resistor 1222 and a second terminal connected to the output node of the video DAC 1206, and the switch 1224 is controlled via a switch signal SW1. The switch 1228 includes a first terminal connected to the output node via the pin 1218 and a second terminal, and the switch 1228 is controlled via a switch control signal SW2 provided from the display controller 112 via, for example, a general input/output pin (GPIO) 1230. The resistor 1226 includes a first terminal connected to the second terminal of the switch 1228 and a second terminal connected to a ground reference. The connect/disconnect detect module 1210 includes an input to receive the output of the comparator 1216, an output to provide the switch control signal SW1, an output to provide the switch control signal SW2, and an output to provide a detect signal (DETECT) to the application processor 1220.

In the illustrated example, the accessory connector 1216 is used to connect any of a variety of accessory devices to the video processing device 102 (FIG. 1), including, but not limited to, a display device (e.g., a television or monitor), cable device (e.g., a set top box), headphones, headsets, speakers, and the like. The accessory connector 1216 can include a temporarily-connected accessory connector or permanently-connected accessory connector. However, due to the variety of accessory devices that can be connected to the accessory connector 1216 (or due to the change in impedance of a more permanently attached accessory connector 1216 as it is enabled or disabled), it often is advantageous to determine the accessory class (in terms of impedance ranges) of the accessory device in addition to determining whether an accessory device has been connected. Accordingly, as described in greater detail below with reference to FIG. 13, the switches 1224 and 1228 can be individually manipulated through a series of detection steps to determine not only whether the accessory device 1203 has been connected, but to determine the accessory class of the accessory device 1203 when detected as connected. An accessory class typically can be represented by a particular impedance or impedance range.

In at least one embodiment, the resistance $R_1$ of the pull-up resistor 1222 is selected to be much larger than the expected resistance $R_A$ of the accessory device 1203 such that when the switch 1224 is activated (i.e., "closed" or made conductive), the voltage $V_{NODE}$ of the output node is pulled to approximately $V_{DD}$ when the accessory device 1203 is not connected and the voltage VNODE of the output node is pulled to approximately 0 V (or the ground voltage reference) when the accessory device 1203 is connected. To illustrate, assuming that the maximum expected resistance $R_A$ is 8 kΩ, a resistance of at least 15 kΩ for the resistor 1222 may be sufficient for the voltage $V_{NODE}$ to be identified as HIGH or a logic "1" when the accessory device 1203 is not connected (or in a first enable state) and the voltage $V_{NODE}$ to be identified as LOW or a logic "0" when the accessory device 1203 is connected (or in a second enable state). Likewise, the resistance of the resistor 1226 can be selected to match the impedance of the intermediate impedance class of the accessory device 1203.

FIG. 13 illustrates an example method 1300 of operation of the implementation of FIG. 12 for detecting whether an accessory device has been connected, and if detected as connected, the accessory class of the accessory device in accordance with at least one embodiment of the present disclosure. The method 1300 can represent the operation of the state machine 200 of FIG. 2 for the state 204.

In the depicted example, it is assumed that the accessory device 1203 can belong to three accessory classes: a first accessory class having an impedance of 30Ω or less (e.g., headphones or speakers having impedances of 8Ω or 16Ω); a second accessory class having an impedance of approximately 75Ω (e.g., televisions, monitors, and cable interfaces); and a third accessory class having an impedance of greater than 300Ω (e.g., microphones or headsets). Based on these example impedance ranges of the different accessory classes, the resistance $R_2$ of the resistor 1226 can be selected to be 75Ω so as to match the middle impedance range. Other resistances can be selected for different impedance ranges as appropriate. Also in this example, it is assumed that the voltage reference $V_{DD}$ is 2.5 V.

At block 1302, the connect/disconnect detect module 1210 initiates the process of determining whether the accessory device 1203 is connected by enabling the switch 1224 (switch 1) and disabling the switch 1228 (switch 2) via switch control signals SW1 and SW2, respectively. Further, the connect/disconnect detect module 1210 disables the video DAC 1206, and it is assumed that in the disabled state the video DAC 1206 has a relatively high impedance from the viewpoint of the output node. In this configuration, the output node is connected to the voltage reference $V_{DD}$ via the resistor 1222. If the accessory device 1203 is connected, the output node also is connected to ground via the resistance $R_A$ of the accessory device 1203. Accordingly, the resistor 1222 and the resistance $R_A$ operate as a voltage divider such that the voltage VNODE of the output node can be represented by the following equation EQ. 1:

$$V_{NODE} = V_{DD} \times \frac{R_A}{R_A + R_1} \qquad \text{EQ. 1}$$

Thus, in the event that the accessory device 1203 is disconnected, the resistance $R_A$ is effectively infinite and thus the voltage $V_{NODE}$ is approximately equal to the voltage reference $V_{DD}$. Assuming the voltage reference $V_{DD}$ is logic HIGH, $V_{NODE}$=HIGH in this instance. Otherwise, if the accessory device 1203 is connected and the resistance R1 is much greater than the resistance $R_A$ (i.e., R1>>$R_A$), the voltage $V_{NODE}$ is approximately equal to ground, or $V_{NODE}$=LOW (assuming the ground voltage reference is logic LOW).

Accordingly, at block 1304, the connect/disconnect detect module 1210 determines whether the voltage $V_{NODE}$ is logic HIGH (near $V_{DD}$) or logic LOW (near ground). Alternately, the connect/disconnect detect module 1210 can set the voltage generator 1214 to generate a voltage reference $V_{REF}$ between ground and $V_{DD}$ and use the output of the comparator 1216 to determine whether the voltage $V_{NODE}$ is logic HIGH or logic LOW. In the event that the voltage $V_{NODE}$ is at logic LOW, the connect/disconnect detect module 1210 identifies the accessory device 1203 as disconnected and the method 1300 therefore returns to block 1302 for the next detect cycle. Otherwise, in the vent that the voltage $V_{NODE}$ is at or near logic HIGH, the connect/disconnect detect module 1210 identifies the accessory device 1203 as connected at block 1308. Further, the connect/disconnect detect module 1210 can notify the application processor 1220 of the detected connection of the accessory device 1203 via the DETECT signal or via an interrupt.

Having detected the connection of the accessory device 1203, the connect/disconnect detect module 1210 initiates the process of determining the accessory class of the accessory device 1203. At block 1310, the connect/disconnect detect module 1210 disables the switch 1224 (switch 1) and disables the switch 1228 (switch 2) via switch control signals SW1 and SW2, respectively. Further, the connect/disconnect detect module 1210 enables the video DAC 1206, which is assumed to have a resistance $R_{DAC}$ in view of the output node when enabled. At block 1312, the connect/disconnect detect module 1210 signals the application processor 1220 to output a predetermined value to the video DAC 1206 so that the video DAC 1206 drives a predetermined current $I_{TEST}$ at the output node, thereby generating a voltage $V_{NODE}$ at the output node.

In the configuration resulting from the process at block 1310, the effective resistance $R_{NODE}$ at the output node is represented by equation EQ. 2:

$$R_{NODE} = R_{DAC} \| R_A \qquad \text{EQ. 2}$$

Accordingly, the voltage $V_{NODE}$ at the output node resulting from the output of the current $I_{TEST}$ at block 1312 is represented by equation EQ. 3:

$$V_{NODE} = I_{TEST} \times R_{NODE} = I_{TEST} \times R_{DAC} \| R_A \qquad \text{EQ. 3}$$

If the accessory device 1203 is not connected, EQ. 3 reduces to $V_{NODE} = I_{TEST} \times R_{DAC}$.

At block 1314, the connect/disconnect detect module 1210 configures the voltage generator 1214 to output a specified reference voltage $V_{REF}$ and the comparator 1216 provides a particular output voltage based on a comparison of the voltage $V_{NODE}$ with the voltage $V_{REF}$. In at least one embodiment, the reference voltage $V_{REF}$ is selected based on the current $I_{TEST}$ and the two highest impedances or impedance ranges expected for the accessory device 1203 based on the following relationship EQ. 4:

$$I\text{TEST} \times R_{DAC} \| R_{n-1} \| R_2 < V_{REF} < I\text{TEST} \times R_{DAC} \| R_n \| R_2 \qquad \text{EQ. 4}$$

where $R_n$ represents the lowest impedance of the highest expected impedance range and $R_{n-1}$ represents the highest impedance of the second highest expected impedance range. To illustrate, assuming that the current $I_{TEST}$ is 20 mA and the three accessory classes have impedance ranges of <30Ω, 75Ω, and >300Ω, and the resistance RDAC is 75Ω, the corresponding range is 0.5 V. to 0.66 V (i.e., 20 mA* (75Ω∥75Ω∥75Ω) to 20 mA*(75Ω∥75Ω∥300Ω)) and thus the voltage $V_{REF}$ can be selected within this range, for example, $V_{REF}$=0.55 V.

Accordingly, if the voltage $V_{NODE}$ at the output node resulting from the output of the current $I_{TEST}$ is determined to be not greater than the voltage $V_{REF}$ at block 1314, the accessory device 1203 is identified at block 1316 as being in the class of accessories having impedances of less than 30Ω, such as headphones or speakers. The connect/disconnect detect module 1210 then can provide an indicator of the accessory class of <30Ω to the application processor 1220, which may configure its operation and the operation of other components of the video processing device 102 accordingly.

Otherwise, if the voltage $V_{NODE}$ is determined to be greater than the voltage VREF at block 1314, at block 1318 the connect/disconnect detect module 1210 disables the switch 1224 (switch 1) and enables the switch 1228 (switch 2) via switch control signals SW1 and SW2, respectively. So configured, the connect/disconnect detect module 1210 signals the application processor 1220 to provide the predetermined value to the video DAC 1206 so as to drive the predetermined current $I_{TEST}$ at the output node. At block 1322, the comparator 1216 provides a particular output voltage based on a comparison of the resulting voltage $V_{NODE}$ with the voltage $V_{REF}$. In the configuration resulting from the process at block 1318, the effective resistance $R_{NODE}$ at the output node is represented by equation EQ. 5:

$$R_{NODE}=R_{DAC}\|R_2\|R_A \qquad \text{EQ. 5}$$

Accordingly, the voltage $V_{NODE}$ at the output node resulting from the output of the current $I_{TEST}$ at block 1320 is represented by equation EQ. 6:

$$V_{NODE}=I_{TEST}\times R_{NODE}=I_{TEST}\times R_{DAC}\|R_2\|R_A \qquad \text{EQ. 6}$$

If the accessory device 1203 is not connected, EQ. 6 reduces to $V_{NODE}=I_{TEST}\times R_{DAC}\|R_2$. As the impedance range of <30Ω was ruled out at blocks 1314 and 1316, it remains only to determine whether the accessory device 1203 is in the 75Ω class or >300Ω class. Using the example values above, if the accessory device 1203 is in the 75Ω class, the voltage $V_{NODE}$ at block 1322 would be approximately 0.5 V (i.e., 20 mA×75Ω∥75Ω∥75Ω), which is less than the voltage $V_{REF}$ of 0.57 V. Conversely, if the accessory device 1203 is in the >300Ω class, the voltage $V_{NODE}$ at block 1322 would be greater than 0.66 V (i.e., 20 mA×75Ω∥75Ω∥300Ω), which is greater than the voltage reference $V_{REF}$ of 0.57 V. Accordingly, if the voltage $V_{NODE}$ is identified as not greater than the voltage $V_{REF}$ by the comparator 1216, the active detect module 1210 identifies the accessory device 1203 as belonging to class of accessory devices having impedances of approximately 75Ω at block 1324 and signals this identification to the application processor 1220 so that the video processing device 102 (FIG. 1) can be configured accordingly. Otherwise, if the voltage $V_{NODE}$ is identified as greater than the voltage $V_{REF}$ by the comparator 1216, the active detect module 1210 identifies the accessory device 1203 as belonging to class of accessory devices having impedances of >300Ω at block 1326 and signals this identification to the application processor 1220 so that the video processing device 102 (FIG. 1) can be configured accordingly.

Although FIGS. 12 and 13 illustrate an example implementation for determining which of three different impedance ranges an connected accessory belongs, the technique of FIGS. 12 and 13 can be adapted to determine more than three impedance ranges in accordance with at least one embodiment of the present disclosure. To illustrate, a plurality of resistors and switches can be used to selectively couple the output node to the ground voltage reference so as to generate different effective resistances at the output node. The voltage resulting from the application of the known current $I_{TEST}$ to the different effective resistances then can be used to determine which impedance class of four or more impedance classes applies to the connected accessory device.

In addition to hardware implementations of devices that are adapted to survive perform the functionality in accordance with one of the embodiments of the present invention, such devices may also be embodied in software disposed, for example, in a computer usable (e.g., readable) medium configured to store the software (e.g., a computer readable program code). The program code causes the enablement of embodiments of the present invention, including the following embodiments: (i) the functions of the systems and methods disclosed herein (such as systems and methods detecting display and/or accessory connection and/or accessory class); (ii) the fabrication of the systems and methods disclosed herein (such as the fabrication of devices that are enabled to detect display and/or accessory connection and/or accessory class); or (iii) a combination of the functions and fabrication of the systems and methods disclosed herein.

For example, this can be accomplished through the use of general programming languages (such as C or C++), hardware description languages (HDL) including Verilog, Verilog-A, HDL, VHDL, Altera HDL (AHDL) and so on, or other available programming and/or schematic capture tools (such as circuit capture tools). The program code can be disposed in any known computer usable medium including semiconductor, magnetic disk, optical disk (such as CD-ROM, DVD-ROM) and as a computer data signal embodied in a computer usable (e.g., readable) transmission medium (such as a digital, optical, or analog-based medium). It is understood that the functions accomplished and/or structure provided by the systems and techniques described above can be represented in a core (such as a GPU core) that is embodied in program code and may be transformed to hardware as part of the production of integrated circuits via synthesis of the hardware description language-based software representation.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
   providing a video signal for transmission via an output node of a display interface of a video processing device, the display interface coupleable to a display device and the video signal comprising an active segment comprising image information and an inactive segment comprising synchronization information, wherein providing the video signal comprises:
   providing a predetermined first current to the output node during transmission of both the active segment and the inactive segment, the display device being configured to latch the first current as a reference black level during the inactive segment; and
   providing a second current representative of the active segment to the output node during transmission of the active segment, wherein a total current provided to the output node during transmission of the active segment is equal to a sum of the first current and the second current; and determining whether the display device is coupled to the display interface based on a comparison of a first voltage at the output node during transmission of an inactive component of the inactive segment via the output node to a reference voltage, the first voltage generated at the output node in response to providing the first current to the output node.

2. The method of claim 1, further comprising:

configuring the video processing device into a low power mode in response to determining that a display device is not connected to the display interface based on the comparison of the first voltage to the reference voltage.

3. A video processing device comprising:

a display interface coupleable to a display device;

a display controller configured to transmit a video signal via an output node of the display interface, the video signal comprising an active segment comprising video information and an inactive segment comprising synchronization information, wherein the display interface is configured to provide the video signal by:

providing a predetermined first current to the output node during transmission of both the active segment and the inactive segment, the display device being configured to latch the first current as a reference black level during the inactive segment; and providing a second current representative of the active segment to the output node during transmission of the active segment, wherein a total current provided to the output node during transmission of the active segment is equal to a sum of the first current and the second current; and a display detector configured to determine whether the display device is coupled to the display interface based on a comparison of a first voltage at the output node during transmission of the inactive segment to a reference voltage, the first voltage generated at the output node in response to the provision of the first current to the output node.

4. The video processing device of claim 3, wherein the display interface is compatible with a display interface selected from a group consisting of: a Red-Green-Blue (RGB) interface; a composite video interface; a component video interface; and an S-video interface.

5. The video processing device of claim 3, wherein the inactive segment comprises one selected from a group consisting of: a horizontal synchronization component; and a vertical synchronization component.

6. The video processing device of claim 3, further comprising:

a controller to configure the video processing device into a low power mode in response to determining that a display device is not connected to the display interface based on the comparison of the first voltage to the reference voltage.

7. A method comprising:

converting, at a video processing device, a series of pixel values to a corresponding output current;

providing the output current to an output node of a display interface of the video processing device for transmission, a voltage of the output node varying with the output current;

for each pixel value of the series of pixel values:

comparing the pixel value with a threshold value;

adjusting a count value in response to determining the pixel value is at least as great as the threshold value; and resetting the count value in response to determining the pixel value is less than the threshold value; and responsive to the count value reaching a predetermined settling value, determining whether a display device has been disconnected from the display interface based on a comparison of a reference voltage to the voltage at the output node.

8. The method of claim 7, wherein the series of pixel values comprises pixel values of a component of a video signal, the component comprising one of a group selected from: a color component; a luminance component; or a chrominance component.

9. The method of claim 7, further comprising:

configuring the video processing device into a low power mode in response to determining that the display device has been disconnected from the display interface based on the comparison of the reference voltage to the voltage at the output node.

10. The method of claim 7, wherein:

the output current has a maximum current, wherein the voltage at the output node for the maximum current is a first voltage when the display device is connected and is a second voltage when the display device is not connected, the second voltage greater than the first voltage;

the threshold value corresponds to a first output current, wherein the voltage at the output node for the first current is a third voltage when the display device is connected and is a fourth voltage when the display device is not connected, the third voltage less than the first voltage and the fourth voltage greater than the first voltage and less than the reference voltage; and the reference voltage is greater than the first voltage and less than the fourth voltage.

11. A video processing device comprising:

a display interface coupleable to a display device;

a video digital-to-analog converter (DAC) to convert a series of pixel values to a corresponding output current and to provide the output current to an output node of the display interface for transmission, a voltage of the output node varying with the output current;

a digital comparator comprising an input to receive the series of pixel values, an input to receive a threshold value, and an output, wherein the digital comparator is to, for each pixel value of the series of pixel values, provide a first value in response to determining the pixel value meets or exceeds the threshold value and provide a second value in response to determining the pixel value is less than the threshold value;

a counter comprising an input connected to the output of the digital comparator and an output, wherein the counter is to:

adjust a count value in response to receiving the first value at the input;

reset the count value in response to receiving the second value at the input; and provide a compare indicator at the output in response to the count value reaching a predetermined settling value;

a voltage comparator to compare a reference voltage to the voltage at the output node in response to the compare indicator; and a disconnect detect module to determine whether a display device has been disconnected from the display interface based on an output of the comparator in response to the compare indicator.

12. The video processing device of claim 11, wherein the disconnect detect module further is to configure the video processing device into a low power mode in response to determining that the display device has been disconnected from the display interface based on the output of the comparator.

13. The video processing device of claim 11, wherein:
the video DAC has a maximum current, wherein the voltage at the output node for the maximum current is a first voltage when the display device is connected and is a reference voltage when the display device is not connected, the reference voltage greater than the first voltage;
the threshold value corresponds to a first output current, wherein the voltage at the output node for the first current is a third voltage when the display device is connected and is a fourth voltage when the display device is not connected, the third voltage less than the first voltage and the fourth voltage greater than the first voltage and less than the second voltage; and
the reference voltage is greater than the first voltage and less than the fourth voltage.

14. A tangible computer readable medium storing instructions which are operable upon by a computer system to manipulate the computer system to perform a portion of a process to fabricate a device, the device comprising:
a display interface coupleable to a display device;
a video digital-to-analog converter (DAC) to convert a series of pixel values to a corresponding output current and to provide the output current to an output node of the display interface for transmission, a voltage of the output node varying with the output current;
a digital comparator comprising an input to receive the series of pixel values, an input to receive a threshold value, and an output, wherein the digital comparator is to, for each pixel value of the series of pixel values, provide a first value in response to determining the pixel value meets or exceeds the threshold value and provide a second value in response to determining the pixel value is less than the threshold value;
a counter comprising an input connected to the output of the digital comparator and an output, wherein the counter is to:
adjust a count value in response to receiving the first value at the input;
reset the count value in response to receiving the second value at the input; and
provide the compare indicator at the output in response to the count value reaching a predetermined settling value;
a voltage comparator to compare a reference voltage to the voltage at the output node in response to the compare indicator; and
a disconnect detect module to determine whether a display device has been disconnected from the display interface based on an output of the comparator in response to the compare indicator.

15. The tangible computer readable medium of claim 14, wherein the disconnect detect module further is to configure the device into a low power mode in response to determining that the display device has been disconnected from the display interface based on the output of the comparator.

16. The tangible computer readable medium of claim 14, wherein:
the video DAC has a maximum current, wherein the voltage at the output node for the maximum current is a first voltage when the display device is connected and is a second voltage when the display device is not connected, the second voltage greater than the first voltage;
the threshold value corresponds to a first output current, wherein the voltage at the output node for the first current is a third voltage when the display device is connected and is a fourth voltage when the display device is not connected, the third voltage less than the first voltage and the fourth voltage greater than the first voltage and less than the reference voltage; and
the reference voltage is greater than the first voltage and less than the fourth voltage.

17. The tangible computer readable medium of claim 14, wherein the instructions comprise register transfer level (RTL) instructions configured to determine a design of the device.

* * * * *